(12) United States Patent
Lee et al.

(10) Patent No.: US 11,277,502 B2
(45) Date of Patent: *Mar. 15, 2022

(54) COMMUNICATION DEVICE, PROCESSING DEVICE AND METHOD FOR TRANSMITTING DATA UNIT

(71) Applicant: LG Electronics Inc., Seoul (KR)

(72) Inventors: Gyeongcheol Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/089,251

(22) Filed: Nov. 4, 2020

(65) Prior Publication Data

US 2021/0051760 A1    Feb. 18, 2021

Related U.S. Application Data

(63) Continuation of application No. 16/701,791, filed on Dec. 3, 2019, now Pat. No. 10,869,361, which is a
(Continued)

(51) Int. Cl.
  *H04L 29/08* (2006.01)
  *H04L 1/18* (2006.01)
  (Continued)

(52) U.S. Cl.
  CPC ............ *H04L 69/321* (2013.01); *H04L 1/189* (2013.01); *H04L 69/322* (2013.01); *H04W 74/06* (2013.01); *H04W 80/02* (2013.01)

(58) Field of Classification Search
  CPC ..... H04L 1/1685; H04L 1/189; H04L 69/321; H04L 69/322; H04W 28/065
  See application file for complete search history.

(56) References Cited

U.S. PATENT DOCUMENTS

2013/0194933 A1*  8/2013  Celik ............... H04L 1/1685
                                                         370/242
2015/0215076 A1*  7/2015  Lee ................ H04L 1/1825
                                                         370/329
(Continued)

FOREIGN PATENT DOCUMENTS

WO    WO2013110192    8/2013
WO    WO2019135626    7/2019

OTHER PUBLICATIONS

Huawei, HiSilicon, "Remaining issues for polling in NR RLC," R2-1709661, 3GPP TSG-RAN WG2 Meeting #99, Berlin, Germany, dated Aug. 21-25, 2017, 5 pages.
(Continued)

*Primary Examiner* — Omer S Mian
(74) *Attorney, Agent, or Firm* — Fish & Richardson P.C.

(57) ABSTRACT

A communication device, processing device or method constructs M RLC PDUs including M RLC SDUs, respectively, where M is larger than 1; submits, for a transmission opportunity, only L RLC PDUs for L RLC SDUs with lowest L SNs among the M RLC PDUs to a MAC layer, where L<M and the L RLC PDUs include a first RLC PDU having a poll to trigger status reporting at a receiving device; transmits the L RLC PDUs to the receiving device; constructs a second RLC PDU including a second RLC SDU having a highest SN among SNs of RLC SDUs submitted to the MAC layer, when the poll retransmission timer started upon submitting the first RLC PDU having the poll expires and no new RLC SDU or RLC SDU segment can be transmitted.

20 Claims, 11 Drawing Sheets

Related U.S. Application Data continuation of application No. PCT/KR2019/000189, filed on Jan. 7, 2019.

(60) Provisional application No. 62/614,484, filed on Jan. 7, 2018.

(51) Int. Cl.
*H04W 74/06* (2009.01)
*H04W 80/02* (2009.01)
*H04L 69/321* (2022.01)
*H04L 69/322* (2022.01)

(56) References Cited

U.S. PATENT DOCUMENTS

2017/0156145 A1* 6/2017 Marinier ............. H04W 72/044
2018/0324641 A1* 11/2018 Tsai ................... H04W 36/0069

OTHER PUBLICATIONS

LG Electronics Inc., "Summary of issues on POLL_SN value mismatch," R2-1801562, 3GPP TSG-RAN WG2 NR Ad Hoc #3, Vancouver, Canada, dated Jan. 22-26, 2018, 4 pages.
Office Action in Indian Appln. No. 202027018270, dated Jul. 31, 2021, 7 pages (with English translation).
Office Action in Japanese Appln. No. 2020-537465, dated Jun. 29, 2021, 6 pages (with English translation).
RAN2, "Presentation of Specification/Report to TSG: TS 38.322, Version 2.0.0," RP-172322, 3GPP TSG-RAN Meeting #78, Lisbon, Portugal, dated Dec. 18-21, 2017, 33 pages.
Extended European Search Report in European Application No. 19736026.6, dated Aug. 7, 2020, 12 pages.
Huawei, HiSilicon, "Remaining issues for polling in NR RLC," R2-1710215, 3GPP TSG-RAN WG2 Meeting #99bis, 3GPP TSG-RAN WG2 Meeting #99bis, Prague, Czech Republic, dated Oct. 9-13, 2017, 5 pages.
Intel Corporation, "Submission of RLC PDUs to MAC," R2-1712690, 3GPP TSG-RAN WG2 Meeting #100, Reno, Nevada, USA, dated Nov. 27-Dec. 1, 2017, 3 pages.
LG Electronics Inc., "Correction on TX_Next-1 for POLL_SN and the RLC SDU for retransmission," R2-1801284, 3GPP TSG-RAN WG2 NR Ad Hoc #3, Vancouver, Canada, dated Jan. 22-26, 2018, 4 pages.
MediaTek Inc., "Text Proposal for RLC procedures," R2-1705514, 3GPP TSG-RAN2#98 meeting, Hangzhou, China, dated May 15-19, 2017, 7 pages, XP051275873.
Nokia, Nokia Shanghai Bell, "Clarifications to the ARQ procedures," R2-1711269, 3GPP TSG-RAN WG2 #99bis, Prague, Czech Republic, dated Oct. 9-13, 2017, 7 pages.
Nokia, Nokia Shanghai Bell, "RLC pre-processing," R2-1711746, 3GPP TSG-RAN WG2 #99bis, Prague, Czech Republic, dated Oct. 9-13, 2017, 7 pages.
PCT International Search Report and Written Opinion in International Application No. PCT/KR2019/000189, dated Apr. 29, 2019, 9 pages.

* cited by examiner

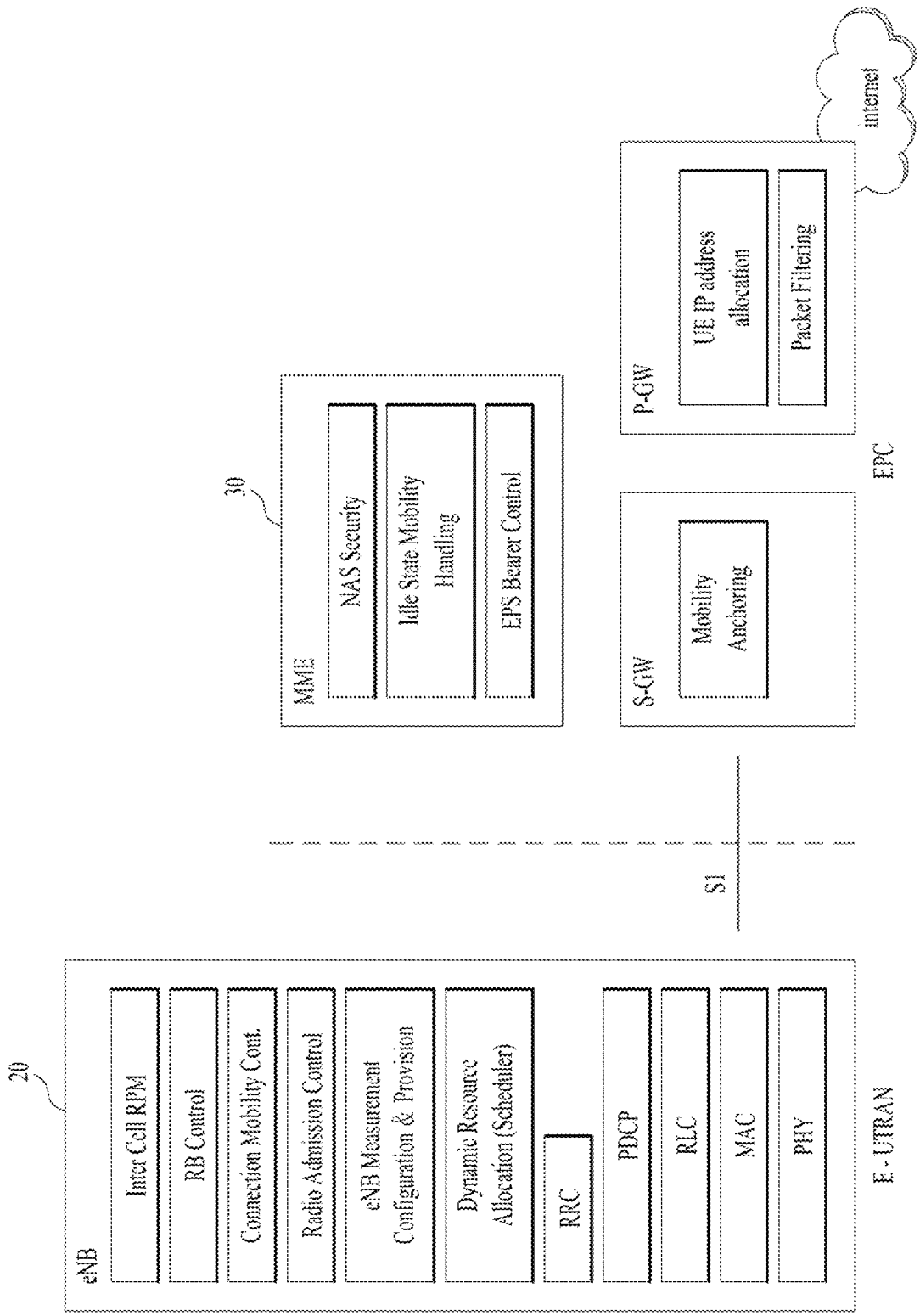

User Plane Protocol Stack

Control Plane Protocol Stack

__US 11,277,502 B2__

COMMUNICATION DEVICE, PROCESSING DEVICE AND METHOD FOR TRANSMITTING DATA UNIT

CROSS-REFERENCE TO RELATED APPLICATIONS

This application is a continuation of U.S. application Ser. No. 16/701,791, filed on Dec. 3, 2019, now allowed, which is a continuation of International Application No. PCT/KR2019/000189, filed on Jan. 7, 2019, which claims the benefit of U.S. Provisional Application No. 62/614,484, filed on Jan. 7, 2018. The disclosures of the prior applications are incorporated by reference in their entirety.

TECHNICAL FIELD

The present disclosure relates to a wireless communication system.

BACKGROUND

As an example of a mobile communication system to which the present disclosure is applicable, a 3rd Generation Partnership Project Long Term Evolution (hereinafter, referred to as LTE) communication system is described in brief.

FIG. 1 is a diagram illustrating an example of a network structure of an E-UMTS as an exemplary radio communication system. An Evolved Universal Mobile Telecommunications System (E-UMTS) is an advanced version of a Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARM)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

SUMMARY

Introduction of new radio communication technologies has led to increases in the number of user equipments (UEs) to which a base station (BS) provides services in a prescribed resource region, and has also led to increases in the amount of data and control information that the BS transmits to the UEs. Due to typically limited resources available to the BS for communication with the UE(s), new techniques are needed by which the BS utilizes the limited radio resources to efficiently receive/transmit uplink/downlink data and/or uplink/downlink control information. In particular, overcoming delay or latency has become an important challenge in applications whose performance critically depends on delay/latency.

The technical objects that can be achieved through the present invention are not limited to what has been particularly described hereinabove and other technical objects not described herein will be more clearly understood by persons skilled in the art from the following detailed description.

In an aspect of the present disclosure, provided herein is a communication device for transmitting a data unit in a wireless communication system. The communication device comprises a transceiver, and a processor configured to control the transceiver. The processor is configured to: construct M radio link control (RLC) protocol data units (PDUs) including M RLC service data units (SDUs), respectively, where M is larger than 1; submit, for a transmission opportunity, only L RLC PDUs for L RLC SDUs with lowest L sequence numbers (SNs) among the M RLC PDUs to a medium access control (MAC) layer, where L<M and the L RLC PDUs include a first RLC PDU having a poll to trigger status reporting at a receiving device; start a poll retransmission timer upon submitting the first RLC PDU having the poll to the MAC layer; control the transceiver to transmit the L RLC PDUs to the receiving device; construct a second RLC PDU including a second RLC SDU having a highest SN among SNs of RLC SDUs submitted to the MAC layer, when the poll retransmission timer expires and no new RLC SDU or RLC SDU segment can be transmitted; and control the transceiver to transmit the second RLC PDU including the second RLC SDU.

In another aspect of the present disclosure, provided herein is a processing device comprising: at least one processor; and at least one computer memory that is operably connectable to the at least one processor and that has stored thereon instructions which, when executed, cause the at least one processor to perform operations. The operations comprises: constructing M radio link control (RLC) protocol data units (PDUs) including M RLC service data units (SDUs), respectively, where M is larger than 1; submitting, for a transmission opportunity, only L RLC PDUs for L RLC SDUs with lowest L sequence numbers (SNs) among the M RLC PDUs to a medium access control (MAC) layer, where L<M and the L RLC PDUs include a first RLC PDU having a poll to trigger status reporting at a receiving device; start a poll retransmission timer upon submitting the first RLC PDU having the poll to the MAC layer; transmitting the L RLC PDUs to the receiving device; constructing a second RLC PDU including a second RLC SDU having a highest SN among SNs of RLC SDUs submitted to the MAC layer, when the poll retransmission timer expires and no new RLC SDU can be transmitted; and transmitting the second RLC PDU including the second RLC SDU.

In a further aspect of the present disclosure, provided herein is a method for transmitting a data unit by a communication device in a wireless communication system. The method comprises: constructing M radio link control (RLC) protocol data units (PDUs) including M RLC service data units (SDUs), respectively, where M is larger than 1; submitting, for a transmission opportunity, only L RLC PDUs for L RLC SDUs with lowest L sequence numbers (SNs) among the M RLC PDUs to a medium access control (MAC) layer, where L<M and the L RLC PDUs include a first RLC PDU having a poll to trigger status reporting at a receiving device; start a poll retransmission timer upon submitting the first RLC PDU having the poll to the MAC layer; transmitting the L RLC PDUs to the receiving device; constructing a second RLC PDU including a second RLC SDU having a highest SN among SNs of RLC SDUs submitted to the MAC layer, when the poll retransmission timer expires and no new RLC SDU can be transmitted; and transmitting the second RLC PDU including the second RLC SDU.

In each aspect of the present disclosure, a poll may be included in the second RLC PDU.

In each aspect of the present disclosure, a state variable may be set to 1+a highest SN among SNs of the M RLC PDUs. The state variable holds an SN to be assigned for a newly generated RLC PDU and is updated whenever an RLC PDU with an SN=the state variable, which includes an RLC SDU or a last segment of an RLC SDU, is constructed.

In each aspect of the present disclosure, a MAC PDU including the L RLC PDUs may be constructed. The MAC PDU including the L RLC PDUs may be transmitted in the transmission opportunity.

In each aspect of the present disclosure, the highest SN among the SNs of the RLC SDUs submitted to the MAC layer is smaller than a highest SN among SNs of the M RLC SDUs.

The above technical solutions are merely some parts of the implementations of the present disclosure and various implementations into which the technical features of the present disclosure are incorporated can be derived and understood by persons skilled in the art from the following detailed description of the present disclosure.

In some scenarios, implementations of the present disclosure may provide one or more of the following advantages. In some scenarios, radio communication signals can be more efficiently transmitted and/or received. Therefore, overall throughput of a radio communication system can be improved.

According to some implementations of the present disclosure, delay/latency occurring during communication between a user equipment and a BS may be reduced.

Also, signals in a new radio access technology system can be transmitted and/or received more effectively.

It will be appreciated by persons skilled in the art that the effects that can be achieved through the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention:

FIG. 3 is a block diagram depicting an example of an architecture of a typical E-UTRAN and a typical EPC;

DETAILED DESCRIPTION

Figure 1:
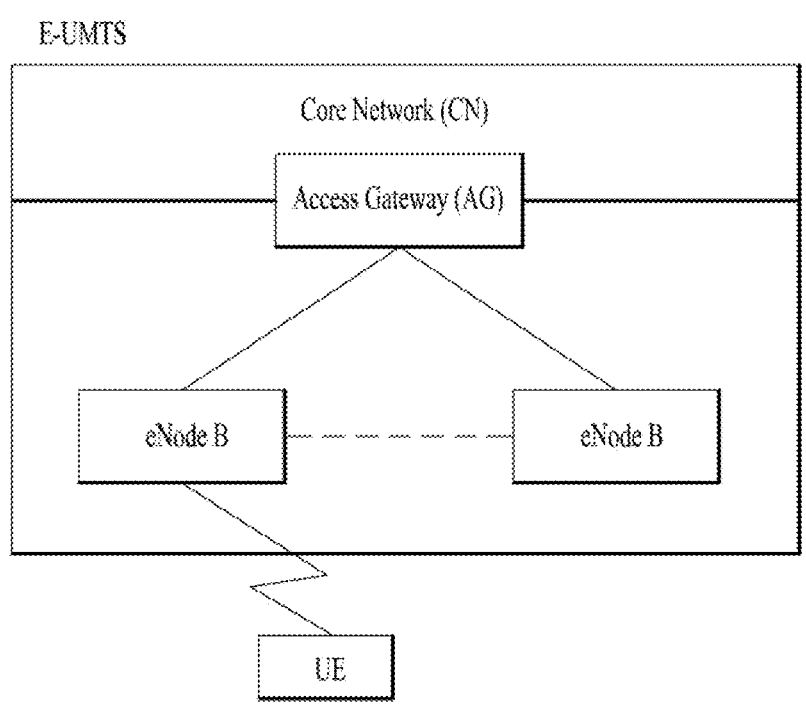
FIG. 1 is a diagram illustrating an example of a network structure of an evolved universal mobile telecommunication system (E-UMTS) as an exemplary radio communication system.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

Reference will now be made in detail to the exemplary implementations of the present disclosure, examples of which are illustrated in the accompanying drawings. The detailed description, which will be given below with reference to the accompanying drawings, is intended to explain exemplary implementations of the present disclosure, rather than to show the only implementations that can be implemented according to the disclosure. The following detailed description includes specific details in order to provide a thorough understanding of the present disclosure. However, it will be apparent to those skilled in the art that the present disclosure may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, implementations of the present disclosure are described in regards to a 3GPP based wireless communication system. However, the technical features of the present disclosure are not limited thereto. For example, although the following detailed description is given based on a mobile communication system corresponding to a 3GPP based system, aspects of the present disclosure that are not limited to 3GPP based system are applicable to other mobile communication systems.

For example, the present disclosure is applicable to contention based communication such as Wi-Fi as well as non-contention based communication as in the 3GPP based system in which a BS allocates a DL/UL time/frequency resource to a UE and the UE receives a DL signal and transmits a UL signal according to resource allocation of the BS. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

For terms and technologies which are not specifically described among the terms of and technologies employed in the present disclosure, the wireless communication standard documents published before the present disclosure may be referenced. For example, the following documents may be referenced.

3GPP LTE

3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol

3GPP NR

3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: Overall description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description In the present disclosure, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the EPC/LTE is referred to as an eNB, and a BS of the new radio (NR) system is referred to as a gNB.

In the present disclosure, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may include a physical antenna or an antenna port or a virtual antenna.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

In the present disclosure, "PDCCH" may refer to a PDCCH, an EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present disclosure, monitoring a channel refers to attempting to decode the channel. For example, monitoring a PDCCH refers to attempting to decode PDCCH(s) (or PDCCH candidates).

In the present disclosure, for dual connectivity (DC) operation, the term "special Cell" refers to the PCell of the master cell group (MCG) or the PSCell of the secondary cell group (SCG), and otherwise the term Special Cell refers to the PCell. The MCG is a group of serving cells associated with a master BS which terminates at least S1-MME, and the SCG is a group of serving cells associated with a secondary BS that is providing additional radio resources for the UE but is not the master BS. The SCG includes a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present disclosure, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, "SPS C-RNTI" refers to a semi-persistent scheduling C-RNTI, and "CS-RNTI" refers to a configured scheduling RNTI.

Figure 2:
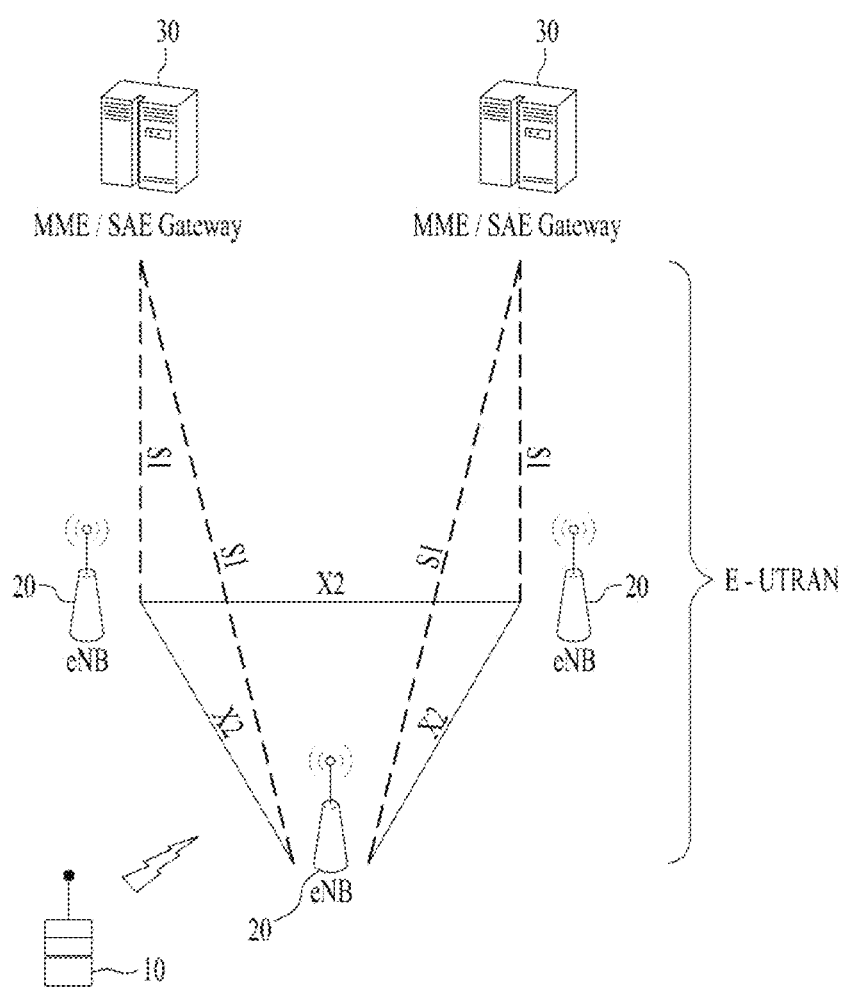
FIG. 2 is a block diagram illustrating an example of an evolved universal terrestrial radio access network (E-UTRAN)

FIG. 2 is a block diagram illustrating an example of an evolved universal terrestrial radio access network (E-UTRAN). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipments (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from BS 20 to UE 10, and "uplink" refers to communication from the UE to a BS.

FIG. 3 is a block diagram depicting an example of an architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, access stratum (AS) Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Building upon its success of IMT-2000 (3G) and IMT-Advanced (4G), 3GPP has been devoting its effort to IMT-2020 (5G) development since September 2015. 5G New Radio (NR) is expected to expand and support diverse use case scenarios and applications that will continue beyond the current IMT-Advanced standard, for instance, enhanced Mobile Broadband (eMBB), Ultra Reliable Low Latency Communication (URLLC) and massive Machine Type Communication (mMTC). eMBB is targeting high data rate mobile broadband services, such as seamless data access both indoors and outdoors, and augmented reality (AR)/virtual reality (VR) applications; URLLC is defined for applications that have stringent latency and reliability requirements, such as vehicular communications that can enable autonomous driving and control network in industrial plants; mMTC is the basis for connectivity in IoT, which allows for infrastructure management, environmental monitoring, and healthcare applications.

Figure 4A:
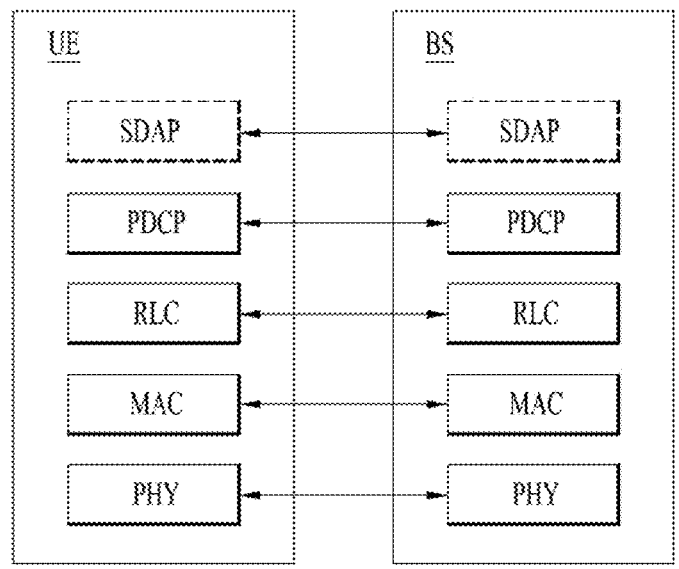
FIGS. 4A and 4B illustrate an example of protocol stacks of the 3GPP based communication system.
Figure 4B:
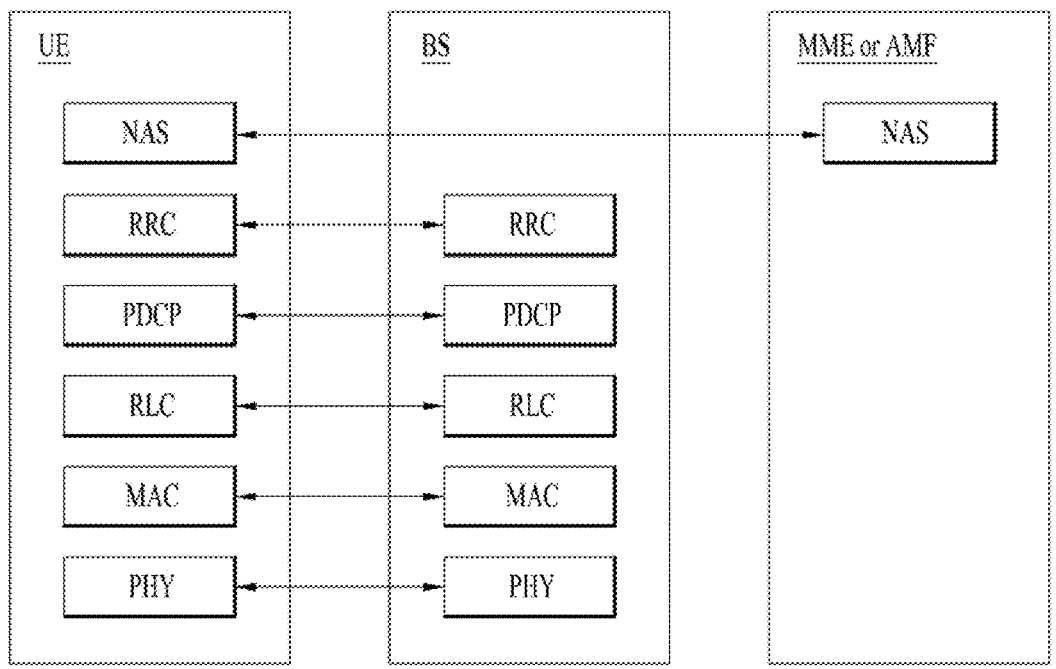

FIGS. 4A and 4B illustrate an example of protocol stacks in a 3GPP based wireless communication system.

In particular, FIG. 4A illustrates an example of a radio interface user plane protocol stack between a UE and a base station (BS) and FIG. 4B illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 4A, the user plane protocol stack may be divided into a first layer (Layer 1) (i.e., a physical (PHY) layer) and a second layer (Layer 2). Referring to FIG. 4B, the control plane protocol stack may be divided into Layer 1 (i.e., a PHY layer), Layer 2, Layer 3 (e.g., a radio resource control (RRC) layer), and a non-access stratum (NAS) layer. Layer 1, Layer 2 and Layer 3 are referred to as an access stratum (AS).

In the 3GPP LTE system, the layer 2 is split into the following sublayers: Medium Access Control (MAC), Radio Link Control (RLC), and Packet Data Convergence Protocol (PDCP). In the 3GPP New Radio (NR) system, the layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G Core Network QoS flows.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of Signalling Radio Bearers (SRBs) and Data Radio Bearers (DRBs); mobility functions (including: handover and context transfer; UE cell selection and reselection and control of cell selection and reselection; Inter-RAT mobility); QoS management functions; UE measurement reporting and control of the reporting; detection of and recovery from radio link failure; NAS message transfer to/from NAS from/to UE.

In the 3GPP NR system, the main services and functions of the PDCP sublayer for the user plane include: sequence numbering; header compression and decompression: ROHC only; transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the RLC sublayer supports three transmission modes: Transparent Mode (TM); Unacknowledged Mode (UM); and Acknowledged Mode (AM). The RLC configuration is per logical channel with no dependency on numerologies and/or transmission durations. In the 3GPP NR system, the main services and functions of the RLC sublayer depend on the transmission mode and include: Transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use. Different kinds of data transfer services are offered by MAC. To accommodate different kinds of data transfer services, multiple types of logical channels are defined i.e. each supporting transfer of a particular type of information. Each logical channel type is defined by what type of information is transferred. Logical channels are classified into two groups: Control Channels and Traffic Channels. Control channels are used for the transfer of control plane information only, and traffic channels are used for the transfer of user plane information only. Broadcast Control Channel (BCCH) is a downlink logical channel for broadcasting system control information, paging Control Channel (PCCH) is a downlink logical channel that transfers paging information, system information change notifications and indications of ongoing PWS broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In Downlink, the following connections between logical channels and transport channels exist: BCCH can be mapped to BCH; BCCH can be mapped to downlink shared channel (DL-SCH); PCCH can be mapped to PCH; CCCH can be mapped to DL-SCH; DCCH can be mapped to DL-SCH; and DTCH can be mapped to DL-SCH. In Uplink, the following connections between logical channels and transport channels exist: CCCH can be mapped to uplink shared channel (UL-SCH); DCCH can be mapped to UL-SCH; and DTCH can be mapped to UL-SCH.

Figure 5:
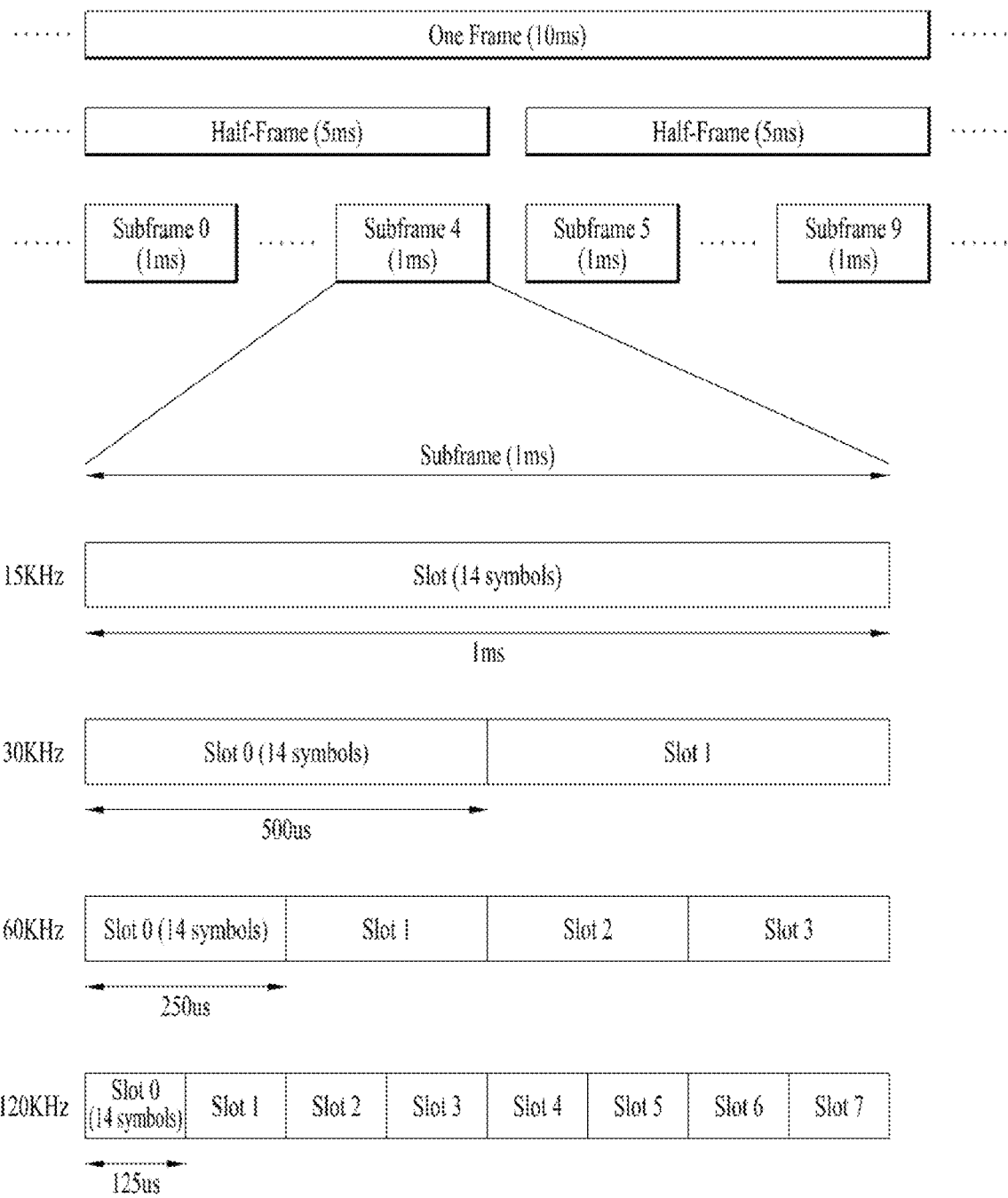
FIG. 5 illustrates an example of a frame structure in the 3GPP based wireless communication system.

FIG. 5 illustrates an example of a frame structure in the 3GPP based wireless communication system.

The frame structure illustrated in FIG. 5 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 5, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz. The following table shows the number of OFDM symbols per slot, the number of slots per frame, and the number of slots per for the normal CP, according to the subcarrier spacing $\Delta f=2^u*15$ kHz.

TABLE 1

| $N^{slot}_{symb}$ | $N^{frame,u}_{slot}$ | $N^{subframe,u}_{slot}$ |
|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2^u*15$ kHz.

TABLE 2

| $N^{slot}_{symb}$ | $N^{frame,u}_{slot}$ | $N^{subframe,u}_{slot}$ |
|---|---|---|
| 2 | 12 | 40 | 4 |

A slot includes plural symbols (e.g., 14 or 12 symbols) in the time domain. For each numerology (e.g. subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g. radio resource control (RRC) signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

Figure 6:
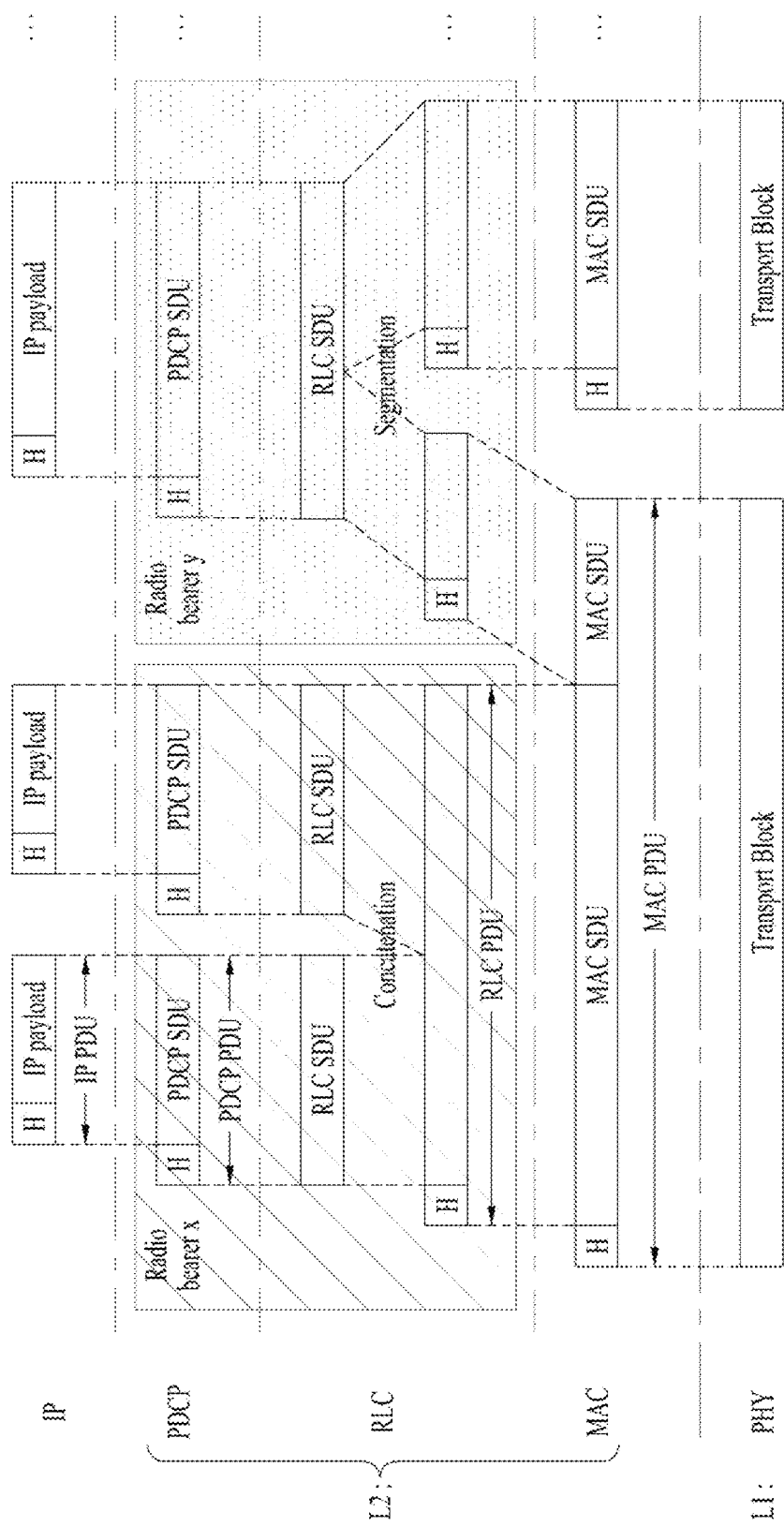
FIG. 6 illustrates an example of a data flow in the 3GPP LTE system.
Figure 7:
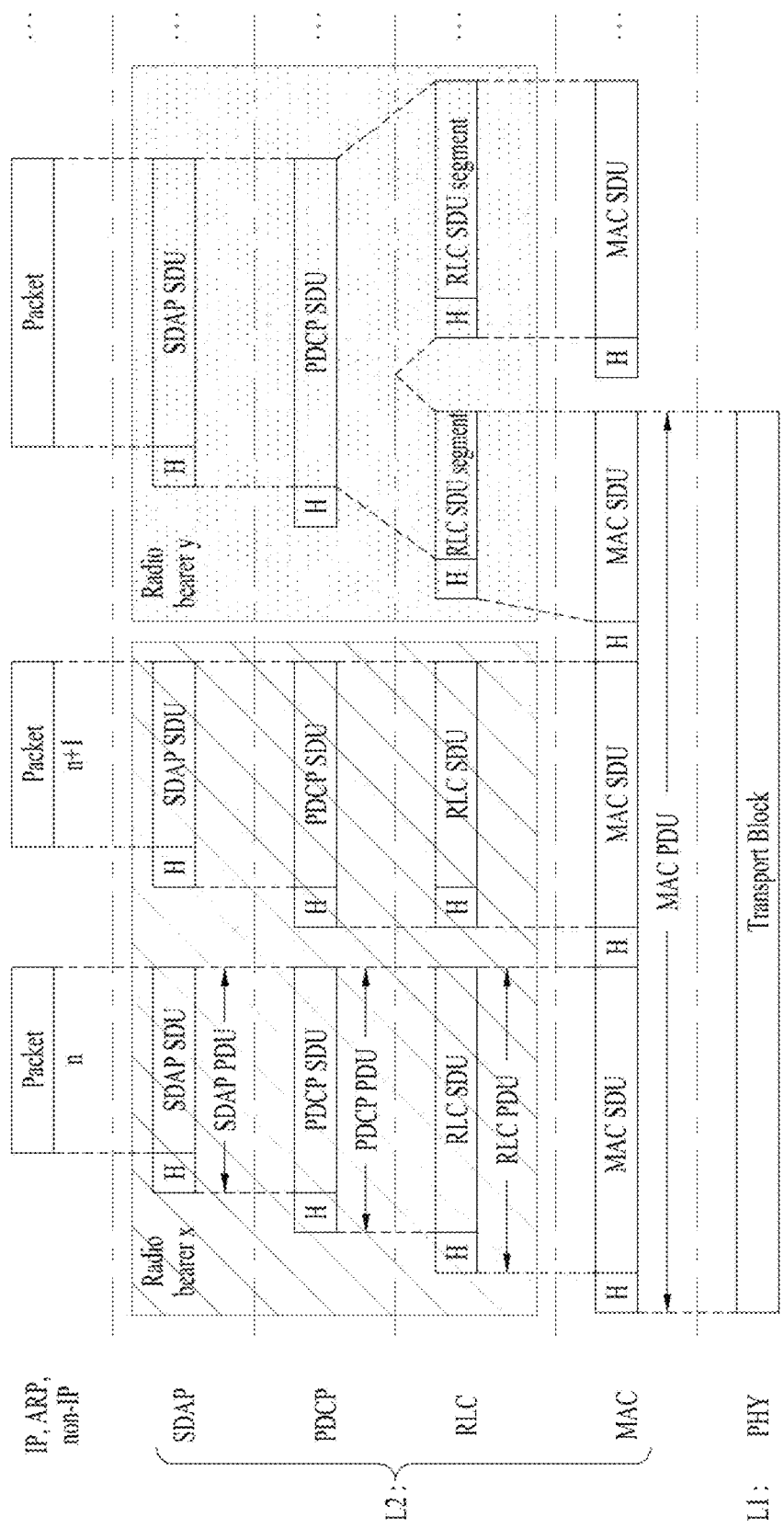
FIG. 7 illustrates an example of a data flow in the 3GPP NR system.

FIG. 6 illustrates an example of a data flow in the 3GPP LTE system, and FIG. 7 illustrates an example of a data flow in the 3GPP NR system. In FIG. 6 and FIG. 7, "H" denotes headers and subheaders.

The MAC PDU is transmitted/received using radio resources through the PHY layer to/from an external device. The MAC PDU arrives to the PHY layer in the form of a transport block. In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Functions of the RLC sublayer are performed by RLC entities. For an RLC entity configured at a BS, there is a peer RLC entity configured at the UE and vice versa. An RLC entity receives/delivers RLC SDUs from/to upper layer and sends/receives RLC PDUs to/from its peer RLC entity via lower layers. An RLC entity can be configured to perform data transfer in one of the following three modes: Transparent Mode (TM), Unacknowledged Mode (UM) or Acknowledged Mode (AM). Consequently, an RLC entity is categorized as a TM RLC entity, an UM RLC entity or an AM RLC entity depending on the mode of data transfer that the RLC entity is configured to provide. A TM RLC entity is configured either as a transmitting TM RLC entity or a receiving TM RLC entity. The transmitting TM RLC entity receives RLC SDUs from upper layer and sends RLC PDUs to its peer receiving TM RLC entity via lower layers. The receiving TM RLC entity delivers RLC SDUs to upper layer and receives RLC PDUs from its peer transmitting TM RLC entity via lower layers. An UM RLC entity is configured either as a transmitting UM RLC entity or a receiving UM RLC entity. The transmitting UM RLC entity receives RLC SDUs from upper layer and sends RLC PDUs to its peer receiving UM RLC entity via lower layers. The receiving UM RLC entity delivers RLC SDUs to upper layer and receives RLC PDUs from its peer transmitting UM RLC entity via lower layers. An AM RLC entity consists of a transmitting side and a receiving side. The transmitting side of an AM RLC entity receives RLC SDUs from upper layer and sends RLC PDUs to its peer AM RLC entity via lower layers. The receiving side of an AM RLC entity delivers RLC SDUs to upper layer and receives RLC PDUs from its peer AM RLC entity via lower layers.

In the implementations of the present disclosure, the following services are expected by RLC from lower layer (i.e. MAC): data transfer; and notification of a transmission opportunity together with the total size of the RLC PDU(s) to be transmitted in the transmission opportunity.

Figure 8:
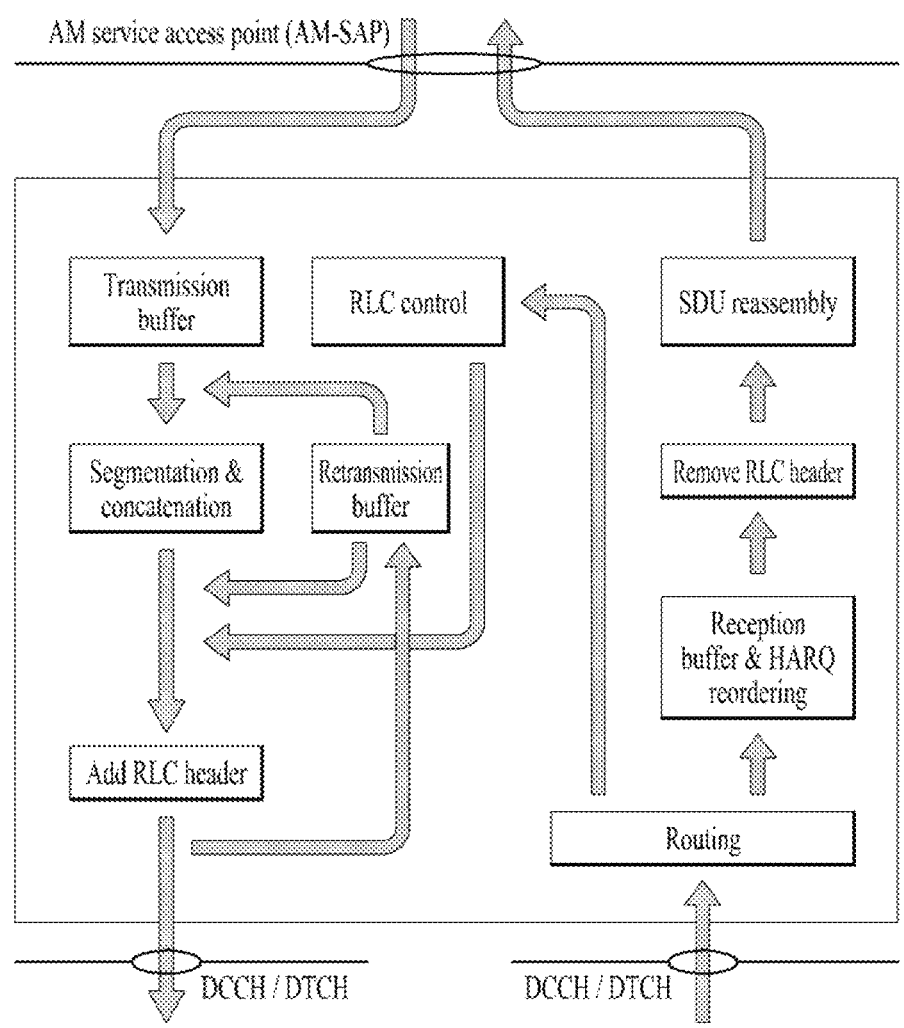
FIG. 8 illustrates a model of an acknowledged mode (AM) radio link control (RLC) entity in the 3GPP LTE system.

FIG. 8 illustrates a model of an acknowledged mode (AM) radio link control (RLC) entity in the 3GPP LTE system.

In the 3GPP LTE system, RLC SDUs of variable sizes which are byte aligned (i.e. multiple of 8 bits) are supported for all RLC entity type (TM, UM and AM RLC entity). RLC PDUs are formed only when a transmission opportunity has been notified by lower layer (i.e. by MAC) and are then delivered to lower layer. In the 3GPP LTE system, the main services and functions of the AM RLC entity include: transfer of upper layer PDUs; error correction through ARQ; concatenation, segmentation and reassembly of RLC SDUs; re-segmentation of RLC data PDUs; and reordering of RLC data PDUs.

Referring to FIG. 8, an AM RLC entity in the 3GPP LTE system (hereinafter, LTE AM RLC entity) can be configured to deliver/receive RLC PDUs through the following logical channels: DL/UL DCCH or DL/UL DTCH. An LTE AM RLC entity delivers/receives the following RLC data PDUs: acknowledge mode data (AMD) PDU, and AMD PDU segment. An LTE AM RLC entity delivers/receives the following RLC control PDU: STATUS PDU. When the transmitting side of an LTE AM RLC entity forms AMD PDUs from RLC SDUs, it shall segment and/or concatenate the RLC SDUs so that the AMD PDUs fit within the total size of RLC PDU(s) indicated by lower layer at the particular transmission opportunity notified by lower layer. After the LTE AM RLC entity does the segmentation/concatenation process, it adds RLC headers to form the AMD PDUs.

The LTE AM RLC entity submits the AMD PDUs to lower layer (MAC). If the LTE AM RLC entity receives NACK for a transmitted RLC PDU or does not receives any response for the transmitted RLC PDU with a poll, from a peer LTE AM RLC entity, for a certain period of time, the LTE AM RLC entity considers the RLC PDU stored in the transmission buffer for retransmission and stores the RLC PDU belonging to the transmission window into the retransmission buffer. If the LTE AM RLC entity gets ACK for the RLC PDU in the retransmission buffer, the LTE AM RLC entity updates state variable and move the transmission window forward.

Alternatively, when submitting the AMD PDUs to lower layer (MAC), the LTE AM RLC entity could generate identical copies of each AMD PDU to submit one of the two copies to lower layer (MAC) and send the copy of to the retransmission buffer. If the LTE AM RLC entity receives NACK for a transmitted RLC PDU or does not receives any response for the transmitted RLC PDU with a poll, from a peer LTE AM RLC entity, for a certain period of time, the LTE AM RLC entity considers the RLC PDU stored in the retransmission buffer for retransmission. If the LTE AM RLC entity gets ACK for the transmitted RLC PDU in the retransmission buffer, the RLC PDU could be discarded.

The transmitting side of an LTE AM RLC entity supports retransmission of RLC data PDUs (ARQ). The LTE AM RLC entity can re-segment the RLC data PDU into AMD PDU segments if the RLC data PDU to be retransmitted does not fit within the total size of RLC PDU(s) indicated by lower layer at the particular transmission opportunity notified by lower layer, where the number of re-segmentation is not limited. When the transmitting side of an LTE AM RLC entity forms AMD PDUs from RLC SDUs received from upper layer or AMD PDU segments from RLC data PDUs to be retransmitted, it shall include relevant RLC headers in the RLC data PDU.

In the 3GPP LTE system, the AM data is transferred between the transmitting side of an LTE RLC entity and the receiving side of an LTE RLC entity as follows. The transmitting side of an LTE AM RLC entity prioritizes transmission of RLC control PDUs over RLC data PDUs. The transmitting side of an LTE AM RLC entity prioritizes retransmission of RLC data PDUs over transmission of new AMD PDUs. The transmitting side of an LTE AM RLC entity shall maintain a transmitting window according to state variables VT(A) and VT(MS) as follows:

a SN falls within the transmitting window if VT(A)<=SN<VT(MS);

a SN falls outside of the transmitting window otherwise.

The transmitting entity of each LTE AM RLC entity shall maintain VT(A) and VT(MS). VT(A) is an acknowledgement state variable which holds the value of the SN of the next AMD PDU for which a positive acknowledgment is to be received in-sequence, and it serves as the lower edge of the transmitting window. VT(A) is initially set to 0, and is updated whenever the LTE AM RLC entity receives a positive acknowledgment for an AMD PDU with SN=VT(A). VT(MS) is the maximum send state variable which equals to VT(A)+AM_Window_Size, and it serves as the higher edge of the transmitting window. AM_Window_Size is a constant used by both the transmitting side and the receiving side of each LTE AM RLC entity to calculate VT(MS) from VT(A), and VR(MR) from VR(R). AM_Window_Size=512 when a 10 bit SN is used, AM_Window_Size=32768 when a 16 bit SN is used. The receiving entity of each LTE AM RLC entity shall maintain VR(R) and VR(MR). VR(R) is a receive state variable which holds the value of the SN following the last in-sequence completely received AMD PDU, and it serves as the lower edge of the receiving window. VR(R) is initially set to 0, and is updated whenever the AM RLC entity receives an AMD PDU with SN=VR(R). VR(MR) is the maximum acceptable receive state variable which equals to VR(R)+AM_Window_Size, and it holds the value of the SN of the first AMD PDU that is beyond the receiving window and serves as the higher edge of the receiving window.

The transmitting side of an LTE AM RLC entity shall not deliver to lower layer any RLC data PDU whose SN falls outside of the transmitting window. When delivering a new AMD PDU to lower layer, the transmitting side of an AM RLC entity shall set the SN of the AMD PDU to VT(S), and then increment VT(S) by one. The transmitting side of each LTE AM RLC entity shall maintain VT(S). VT(S) is a send state variable which holds the value of the SN to be assigned for the next newly generated AMD PDU. VT(S) is initially set to 0, and is updated whenever the AM RLC entity delivers an AMD PDU with SN=VT(S).

The transmitting side of an LTE AM RLC entity can receive a positive acknowledgement (confirmation of successful reception by its peer AM RLC entity) for a RLC data PDU by a STATUS PDU from its peer LTE AM RLC entity. When receiving a positive acknowledgement for an AMD PDU with SN=VT(A), the transmitting side of an LTE AM RLC entity shall:

set VT(A) equal to the SN of the AMD PDU with the smallest SN, whose SN falls within the range VT(A)<=SN<=VT(S) and for which a positive acknowledgment has not been received yet.

if positive acknowledgements have been received for all AMD PDUs associated with a transmitted RLC SDU, send an indication to the upper layers of successful delivery of the RLC SDU.

The transmitting side of an LTE AM RLC entity can receive a negative acknowledgement (notification of reception failure by its peer LTE AM RLC entity) for an AMD PDU or a portion of an AMD PDU by a STATUS PDU from its peer LTE AM RLC entity. When receiving a negative acknowledgement for an AMD PDU or a portion of an AMD PDU by a STATUS PDU from its peer LTE AM RLC entity, the transmitting side of the LTE AM RLC entity shall:

if the SN of the corresponding AMD PDU falls within the range VT(A)<=SN<VT(S), consider the AMD PDU or the portion of the AMD PDU for which a negative acknowledgement was received for retransmission.

When an AMD PDU or a portion of an AMD PDU is considered for retransmission, the transmitting side of the LTE AM RLC entity shall:

if the AMD PDU is considered for retransmission for the first time, set the RETX_COUNT associated with the AMD PDU to zero;

else, if it (the AMD PDU or the portion of the AMD PDU that is considered for retransmission) is not pending for retransmission already, or a portion of it is not pending for retransmission already, increment the RETX_COUNT;

if RETX_COUNT=maxRetxThreshold, indicate to upper layers that max retransmission has been reached. RETX_COUNT is a counter maintained by the transmitting side of each LTE AM RLC entity. RETX_COUNT is initially set to 0 and counts the number of AMD PDUs sent since the most recent poll bit was transmitted. maxRetxThreshold is a parameter configured by RRC and used by the transmitting side of each LTE AM RLC entity to limit the number of retransmissions of an AMD PDU. If the transmitting side of an LTE AM RLC entity is a UE, the UE is configured with maxRetxThreshold by receiving maxRetxThreshold via RRC signaling from a network (e.g. BS).

When retransmitting an AMD PDU, the transmitting side of an LTE AM RLC entity shall:

if the AMD PDU can entirely fit within the total size of RLC PDU(s) indicated by lower layer at the particular transmission opportunity, deliver the AMD PDU as it is except for the P field to lower layer;

otherwise, segment the AMD PDU, form a new AMD PDU segment which will fit within the total size of RLC PDU(s) indicated by lower layer at the particular transmission opportunity and deliver the new AMD PDU segment to lower layer.

When retransmitting a portion of an AMD PDU, the transmitting side of an LTE AM RLC entity shall segment the portion of the AMD PDU as necessary, form a new AMD PDU segment which will fit within the total size of RLC PDU(s) indicated by lower layer at the particular transmission opportunity and deliver the new AMD PDU segment to lower layer.

When forming a new AMD PDU segment, the transmitting side of an AM RLC entity shall only map the Data field of the original AMD PDU to the Data field of the new AMD PDU segment, set the header of the new AMD PDU segment; and set the P field as the polling procedure described below.

An AMD PDU consists of a Data field and an AMD PDU header. The AMD PDU header includes a P field and an SN field. In the 3GPP LTE system, the SN field indicates an SN of the corresponding AMD PDU. For an AMD PDU segment, the SN field indicates the SN of the original AMD PDU from which the AMD PDU segment was constructed from. The P field indicates whether or not the transmitting side of an LTE AM RLC entity requests a STATUS report from its peer LTE AM RLC entity. In the 3GPP LTE and NR systems, the interpretation of the P field is provided in the following table.

TABLE 3

| Value | Description |
|---|---|
| 0 | Status report not requested |
| 1 | Status report is requested |

An LTE AM RLC entity can poll its peer AM RLC entity in order to trigger STATUS reporting at the peer LTE AM RLC entity. Upon assembly of a new AMD PDU, the transmitting side of an LTE AM RLC entity shall:>increment PDU_WITHOUT_POLL by one;

>increment BYTE_WITHOUT_POLL by every new byte of Data field element that it maps to the Data field of the RLC data PDU;

>if PDU_WITHOUT_POLL>=pollPDU; or
>if BYTE_WITHOUT_POLL>=pollByte;
>>include a poll in the RLC data PDU as described below.

Upon assembly of an AMD PDU or AMD PDU segment, the transmitting side of an AM RLC entity shall:

>if both the transmission buffer and the retransmission buffer becomes empty (excluding transmitted RLC data PDU awaiting for acknowledgements) after the transmission of the RLC data PDU; or >if no new RLC data PDU can be transmitted after the transmission of the RLC data PDU (e.g. due to window stalling);

>>include a poll in the RLC data PDU as described below.

The transmitting side of each LTE AM RLC entity shall maintain PDU_WITHOUT_POLL and BYTE_WITHOUT_POLL. PDU_WITHOUT_POLL is a counter which is initially set to 0 and counts the number of AMD PDUs sent since the most recent poll bit was transmitted. BYTE_WITHOUT_POLL is a counter which is initially set to 0 and counts the number of data bytes sent since the most recent poll bit was transmitted. pollPDU and pollByte are parameters configured by RRC. pollPDU is a parameter used by the transmitting side of each LTE AM RLC entity to trigger a poll for every pollPDU PDUs, and pollByte is a parameter used by the transmitting side of each LTE AM RLC entity to trigger a poll for every pollByte bytes. If the transmitting side of an LTE AM RLC entity is a UE, the UE is configured with pollPDU and pollByte by receiving pollPDU and pollByte via RRC signaling from a network (e.g. BS).

To include a poll in a RLC data PDU, the transmitting side of an LTE AM RLC entity shall set the P field of the RLC data PDU to "1"; set PDU_WITHOUT_POLL to 0; set BYTE_WITHOUT_POLL to 0. After delivering a RLC data PDU including a poll to lower layer and after incrementing of VT(S) if necessary, the transmitting side of an AM RLC entity shall:

>set POLL_SN to VT(S)−1;
>if t-PollRetransmit is not running:
>>start t-PollRetransmit;
>else:
>>restart t-PollRetransmit The transmitting side of each LTE AM RLC entity shall maintain POLL_SN. POLL_SN is the poll send state variable which holds the value of VT(S)−1 upon the most recent transmission of a RLC data PDU with the poll bit set to "1". POLL_SN is initially set to 0. t-PollRetransmit is a timer configured by RRC and used by the transmitting side of each LTE AM RLC entity to retransmit a poll. If the transmitting side of an LTE AM RLC entity is a UE, the UE is configured with t-PollRetransmit by receiving t-PollRetransmit via RRC signaling from a network (e.g. BS). Upon reception of a STATUS report from the receiving RLC AM entity the transmitting side of an LTE AM RLC entity shall:

>if the STATUS report comprises a positive or negative acknowledgement for the RLC data PDU with sequence number equal to POLL_SN:

>>if t-PollRetransmit is running:
>>>stop and reset t-PollRetransmit.

Upon expiry of t-PollRetransmit, the transmitting side of an AM RLC entity shall:

>if both the transmission buffer and the retransmission buffer are empty (excluding transmitted RLC data PDU awaiting for acknowledgements); or >if no new RLC data PDU can be transmitted (e.g. due to window stalling):

>>consider the AMD PDU with SN=VT(S)−1 for retransmission; or
>>consider any AMD PDU which has not been positively acknowledged for retransmission;
>include a poll in a RLC data PDU as described above.

An LTE AM RLC entity sends STATUS PDUs to its peer LTE AM RLC entity in order to provide positive and/or negative acknowledgements of RLC PDUs (or portions of them). Triggers to initiate STATUS reporting in an LTE AM RLC entity include polling from its peer LTE AM RLC entity.

As described above, in the 3GPP LTE system, a new AM Data PDU (AMD PDU) can be constructed only when notification of a transmission opportunity is received from lower layer (MAC). When there is notification of a transmission opportunity, a single AMD PDU is constructed and submitted to MAC. The sequence number (SN) of the newly constructed AMD PDU is set to VT(S) which is a send state variable that holds the value of the SN to be assigned for the next newly generated AMD PDU. In the 3GPP LTE system, VT(S)−1 means SN of the last constructed AMD PDU at the transmitting side of an AM RLC entity. In this condition, when a poll retransmission timer (t-PollRetransmit) expires, the transmitting side of an AM RLC entity can consider the AMD PDU with SN=VT(S)−1, which means SN of the last constructed AMD PDU, for retransmission.

In the 3GPP NR system, RLC SDUs of variable sizes which are byte aligned (i.e. multiple of 8 bits) are supported for all RLC entity type (TM, UM and AM RLC entity), which is similar in the 3GPP LTE system. In the 3GPP NR system, however, each RLC SDU is used to construct an RLC PDU without waiting for notification of a transmission opportunity from the lower layer (i.e., by MAC). In the case of UM and AM RLC entities, as shown in FIG. 7, an RLC SDU may be segmented and transported using two or more RLC PDUs based on the notification(s) from the lower layer. RLC PDUs are submitted to lower layer only when a transmission opportunity has been notified by lower layer (i.e. by MAC). In other words, in the 3GPP NR system, the RLC entity is allowed to construct RLC data PDUs in advance even without notification of a transmission opportunity from the lower layer, i.e., pre-construction of RLC data PDU is allowed. When and how many RLC data PDUs are pre-constructed is left up to UE implementation. Therefore, a send state variable (hereinafter, TX_Next) which holds the value of the SN to be assigned for the next newly generated AMD PDU can be incremented whenever a new AMD PDU is constructed without notification of a transmission opportunity by the lower layer. In this condition, if the RLC SDU with SN=TX_Next−1 is considered for retransmission upon expiry of t-PollRetransmit as in the 3GPP LTE system, the transmitting side of an AM RLC entity would try to retransmit the last pre-constructed AMD PDU which is not transmitted yet and not on the transmitting window. This means that the transmitting side of an AM RLC entity may select a wrong RLC SDU for retransmission, which is out of the transmitting window. If no new RLC SDU can be transmitted (e.g. due to window stalling), the transmitting side of an AM RLC entity cannot retransmit an RLC SDU because the selected RLC SDU is not on the transmitting window and there is no space on the transmitting window to transmit the AMD PDU which contains the selected RLC SDU. In other words, the window stalling cannot be resolved. Therefore, in NR, the RLC SDU with SN=TX_Next−1 should not be considered for retransmission and new RLC SDU selection rule for retransmission should be introduced to resolve the problem.

In an implementation of the present disclosure, when a poll retransmission timer (t-PollRetransmit) expires, if both the transmission buffer and the retransmission buffer are empty (excluding transmitted RLC SDU or RLC SDU segment awaiting acknowledgements) or if no new RLC SDU can be transmitted (e.g. due to window stalling), the transmitting side of an AM RLC entity considers the RLC SDU with the highest SN among the RLC SDUs submitted to lower layer (i.e., MAC) for retransmission. In other words, the RLC SDU with the highest SN among the RLC SDUs transmitted by a transmitting device to a receiving device is considered for retransmission. In this implementation, the RLC SDU with the highest SN among the RLC SDUs submitted to lower layer may be or may not be a RLC SDU submitted with a poll.

Alternatively, in another implementation of the present disclosure, when a poll retransmission timer (t-PollRetransmit) expires, if both the transmission buffer and the retransmission buffer are empty (excluding transmitted RLC SDU or RLC SDU segment awaiting acknowledgements) or if no new RLC SDU can be transmitted (e.g. due to window stalling), the transmitting side of an AM RLC entity considers the RLC SDU, which corresponds to the highest SN of the AMD PDU including a poll among the set of AMD PDUs including a poll submitted to lower layer (i.e., MAC), for retransmission.

The implementation(s) of the present disclosure can be applied to any type of UE, e.g., a machine type communication (MTC) UE, narrow band internet of things (NB-IoT) UE, normal UE.

A poll retransmission timer, which is t-PollRetransmit, is used by the transmitting side of an AM RLC entity in order to retransmit a poll. t-PollRetransmit is configured by RRC. If the transmitting side of the AM RLC entity is a UE, the UE is configured with t-PollRetransmit by receiving t-PollRetransmit via RRC signaling from a network (e.g. BS).

In the present disclosure, the transmitted RLC SDUs or RLC SDU segments awaiting acknowledgements means that the transmitting side of an AM RLC entity already transmits RLC SDUs and RLC SDU segments and waits the STATUS report for the transmitted RLC SDUs and RLC SDU segments.

In the present disclosure, "window stalling" means stopping a transmitting window of RLC or means pausing to make the transmitting window progress. For example, if the transmitting window becomes full then the RLC entity may not transmit any new RLC PDU until the lower edge of the transmitting window is advanced. This situation may be referred to as window stalling. In other words, window stalling means that the transmitting side of an AM RLC entity transmits all RLC SDUs and RLC SDU segments within the transmitting window but not yet received any acknowledgements for the transmitted RLC SDUs and RLC SDU segments. Thus, the transmitting side of an AM RLC entity cannot transmit a new RLC SDU because the transmitting side of an AM RLC entity should not submit an AMD PDU, which contains an RLC SDU with SN falls outside of the transmitting window, to lower layer.

In the present disclosure, the highest SN is the highest SN based on modulus operation. For example, when SN can be assigned from 0 to 1023, if the currently assigned SNs start from 1000 and end to 1, the highest SN is 1 because modulus operation sets 1024 and 1025 to 0 and 1 respectively. However if the currently assigned SNs start from 1 and end to 500, the highest SN is 500.

In the present disclosure, an AMD PDU including a poll means an AMD PDU with the poll bit set to "1". In other words, in the present disclosure, including a poll in an RLC PDU refers to including the value "1" in the P field included in the RLC PDU, and an RLC PDU including a poll means an RLC PDU whose P field includes the value "1".

In the implementation(s) of the present disclosure, the transmitting side of an AM RLC entity is configured with timers and parameters for polling procedure by receiving polling configuration information from a network including the followings:

t-PollRetransmit in order to retransmit a poll after expiry of t-PollRetransmit.

pollPDU to trigger a poll for every pollPDU PDUs;

pollByte to trigger a poll for every pollByte bytes. pollPDU is a parameter used by by the transmitting side of each AM RLC entity to trigger a poll for every pollPDU PDUs, and pollByte is a parameter used by the transmitting side of each AM RLC entity to trigger a poll for every pollByte bytes.

In the implementation(s) of the present disclosure, the transmitting side of an AM RLC entity manages the following counters:

PDU_WITHOUT_POLL counts the number of AMD PDUs sent since the most recent poll bit was transmitted, and this counter is initially set to 0;

BYTE_WITHOUT_POLL counts the number of data bytes sent since the most recent poll bit was transmitted, and this counter is initially set to 0.

In the implementation(s) of the present disclosure, when the transmitting side of an AM RLC entity submits a set of AMD PDUs after notification of a transmission opportunity by lower layer (i.e., MAC), the transmitting side of the AM RLC entity may submit an AMD PDU sequentially in increasing order of SN to lower layer (i.e., MAC). Alternatively, the transmitting side of the AM RLC entity may submit multiple AMD PDUs to a lower layer simultaneously.

In the present disclosure, all state variables and all counters are non-negative integers.

Figure 9:
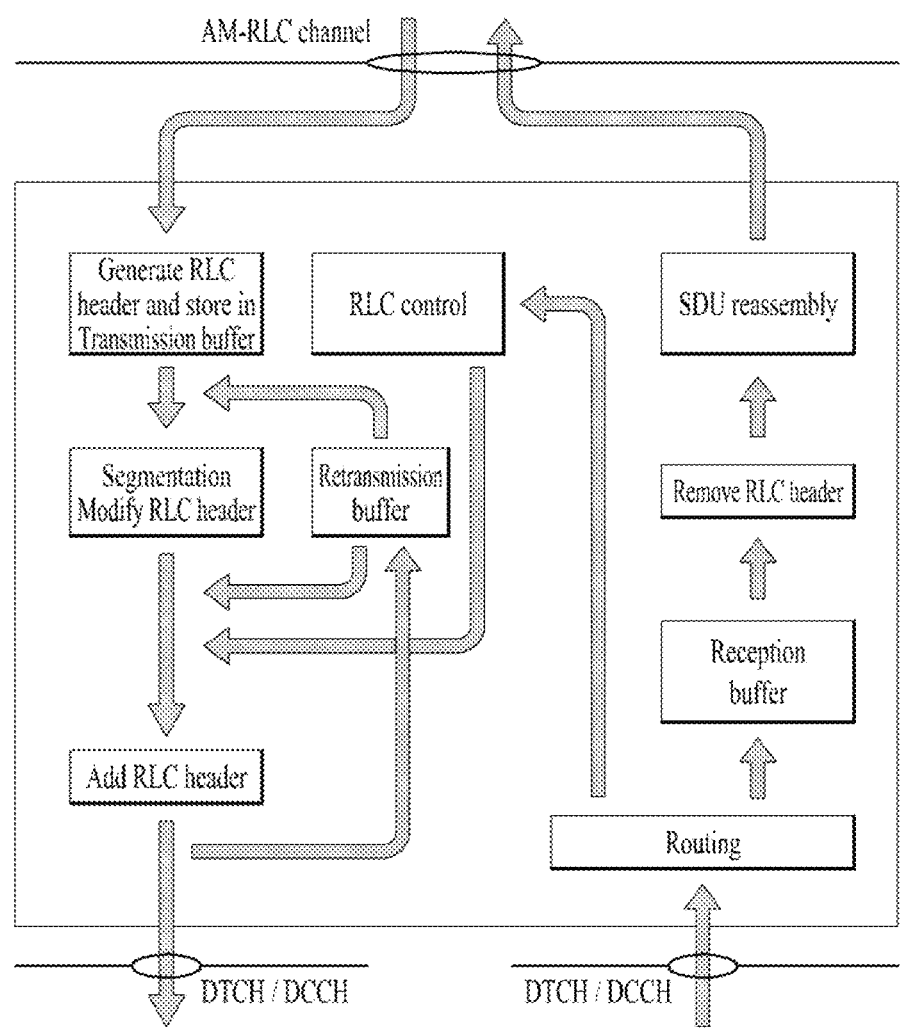
FIG. 9 illustrates a model of AM RLC entity which can be used in the implementation(s) of the present disclosure.

FIG. 9 illustrates a model of AM RLC entity which can be used in the implementation(s) of the present disclosure.

Referring to FIG. 9, an AM RLC entity can be configured to deliver/receive RLC PDUs through the following logical channels: DL/UL DCCH or DL/UL DTCH. An AM RLC entity delivers/receives the following RLC data PDUs: AMD PDU. An AMD PDU contains either one complete RLC SDU or one RLC SDU segment. An AM RLC entity delivers/receives a STATUS PDU which is an RLC control PDU.

In the implementation(s) of the present disclosure, the transmitting side of an AM RLC entity generates AMD PDU(s) for each RLC SDU. When notified of a transmission opportunity by the lower layer, the transmitting AM RLC entity segments the RLC SDUs, if needed, so that the corresponding AMD PDUs, with RLC headers updated as needed, fit within the total size of RLC PDU(s) indicated by lower layer. The transmitting side of an AM RLC entity supports retransmission of RLC SDUs or RLC SDU segments (ARQ). If the RLC SDU or RLC SDU segment to be retransmitted (including the RLC header) does not fit within the total size of RLC PDU(s) indicated by lower layer at the particular transmission opportunity notified by lower layer, the AM RLC entity can segment the RLC SDU or re-segment the RLC SDU segments into RLC SDU segments, where the number of re-segmentation is not limited. When the transmitting side of an AM RLC entity forms AMD PDUs from RLC SDUs or RLC SDU segments, it includes relevant RLC headers in the AMD PDU.

In the implementation(s) of the present disclosure, an AMD PDU consists of a Data field and an AMD PDU header. An AM RLC entity may configured by RRC to use either a 12 bit SN or a 18 bit SN. An AMD PDU header contains a P field and a SN field. The SN field indicates the SN of the corresponding RLC SDU. For RLC AM, the SN is incremented by one for every RLC SDU.

In the implementation(s) of the present disclosure, data transfer procedures between the transmitting side of an RLC entity and the receiving side of an RLC entity are as follows.

The transmitting side of an AM RLC entity prioritizes transmission of RLC control PDUs over AMD PDUs. The transmitting side of an AM RLC entity prioritizes transmission of AMD PDUs containing previously transmitted RLC SDUs or RLC SDU segments over transmission of AMD PDUs containing not previously transmitted RLC SDUs or RLC SDU segments.

The transmitting side of an AM RLC entity shall maintain a transmitting window according to the state variable TX_Next_Ack as follows:

a SN falls within the transmitting window if TX_Next_Ack<=SN<TX_Next_Ack+AM_Window_Size;

a SN falls outside of the transmitting window otherwise. TX_Next_Ack is the acknowledgement state variable maintained in the transmitting side of each AM RLC entity, and holds the value of the SN of the next RLC SDU for which a positive acknowledgment is to be received in-sequence, and it serves as the lower edge of the transmitting window. It is initially set to 0, and is updated whenever the AM RLC entity receives a positive acknowledgment for an RLC SDU with SN=TX_Next_Ack. AM_Window_Size is a constant used by both the transmitting side and the receiving side of each AM RLC entity. AM_Window_Size=2048 when a 12 bit SN is used, AM_Window_Size=131072 when an 18 bit SN is used.

The transmitting side of an AM RLC entity does not submit to lower layer any AMD PDU whose SN falls outside of the transmitting window. For each RLC SDU received from the upper layer (e.g. PDCP), the AM RLC entity associates a SN with the RLC SDU equal to TX_Next and constructs an AMD PDU by setting the SN of the AMD PDU to TX_Next, and increments TX_Next by one. TX_Next is a state variable maintained in the transmitting side of each AM RLC entity and holds the value of the SN to be assigned for the next newly generated AMD PDU. TX_Next is initially set to 0, and is updated whenever the AM RLC entity constructs an AMD PDU with SN=TX_Next which contains an RLC SDU or the last segment of an RLC SDU. In other words, TX_Next would be updated whenever the AM RLC entity constructs an AMD PDU containing an RLC SDU with TX_Next or the last segment of an RLC SDU with SN=TX_Next, since the SN field in an AMD PDU indicates the SN of the corresponding RLC PDU.

When submitting an AMD PDU that contains a segment of an RLC SDU, to lower layer, the transmitting side of an AM RLC entity sets the SN of the AMD PDU to the SN of the corresponding RLC SDU.

The transmitting side of an AM RLC entity can receive a positive acknowledgement (confirmation of successful reception by its peer AM RLC entity) for an RLC SDU by a STATUS PDU from its peer AM RLC entity. When receiving a positive acknowledgement for an RLC SDU with SN=x, the transmitting side of an AM RLC entity sends an indication to the upper layers of successful delivery of the RLC SDU; and sets TX_Next_Ack equal to the SN of the RLC SDU with the smallest SN, whose SN falls within the range TX_Next_Ack<=SN<=TX_Next and for which a positive acknowledgments has not been received yet. In other words, when receiving a positive acknowledgement for an RLC SDU with SN=x, the transmitting side of an AM RLC entity moves the lower edge of the transmitting window forward to the smallest SN of the RLC SDU for which a positive acknowledgment has not been received within the transmitting window.

The transmitting side of an AM RLC entity can receive a negative acknowledgement (notification of reception failure by its peer AM RLC entity) for an RLC SDU or an RLC SDU segment by a STATUS PDU from its peer AM RLC entity. When receiving a negative acknowledgement for an RLC SDU or an RLC SDU segment by a STATUS PDU from its peer AM RLC entity, the transmitting side of the AM RLC entity may consider the RLC SDU or the RLC SDU segment, for which a negative acknowledgement was received, for retransmission if the SN of the corresponding RLC SDU falls within the range TX_Next_Ack<= SN<TX_Next.

When an RLC SDU or an RLC SDU segment is considered for retransmission, the transmitting side of the AM RLC entity:
  sets the RETX_COUNT associated with the RLC SDU to zero if the RLC SDU or RLC SDU segment is considered for retransmission for the first time;
  increments the RETX_COUNT if it (the RLC SDU or the RLC SDU segment that is considered for retransmission) is not pending for retransmission already and the RETX_COUNT associated with the RLC SDU has not been incremented due to another negative acknowledgment in the same STATUS PDU;
  indicate to upper layers that max retransmission has been reached if RETX_COUNT=maxRetxThreshold. RETX_COUNT is a counter maintained in the transmitting side of each AM RLC entity and counts the number of retransmissions of an RLC SDU or RLC SDU segment. There is one RETX_COUNT counter maintained per RLC SDU. maxRetxThreshold is a parameter configured by RRC, and used by the transmitting side of each AM RLC entity to limit the number of retransmissions corresponding to an RLC SDU, including its segments. If the transmitting side of an AM RLC entity is a UE, the UE is configured with maxRetxThreshold by receiving maxRetxThreshold via RRC signaling from a network (e.g. BS).

When retransmitting an RLC SDU or an RLC SDU segment, the transmitting side of an AM RLC entity:
  segments the RLC SDU or the RLC SDU segment if needed;
  forms a new AMD PDU which will fit within the total size of AMD PDU(s) indicated by lower layer at the particular transmission opportunity; and
  submits the new AMD PDU to lower layer.

When forming a new AMD PDU, the transmitting side of an AM RLC entity:
  maps only the original RLC SDU or RLC SDU segment to the Data field of the new AMD PDU; and
  modifies the header of the new AMD PDU. Modifying the header of the new AMD PDU comprises setting the P field as described below.

Upon notification of transmission opportunity by lower layer (i.e., MAC), for each AMD PDU submitted for transmission such that the AMD PDU contains either a not previously transmitted RLC SDU or an RLC SDU segment containing not previously transmitted byte segment, the transmitting side of an AM RLC entity:
  >increments PDU_WITHOUT_POLL by one;
  >increments BYTE_WITHOUT_POLL by every new byte of Data field element that it maps to the Data field of the AMD PDU;
  >if PDU_WITHOUT_POLL>=pollPDU; or
  >if BYTE_WITHOUT_POLL>=pollByte;
  >>sets the P field of the AMD PDU to "1";
  >>sets PDU_WITHOUT_POLL to 0;
  >>sets BYTE_WITHOUT_POLL to 0;
  >submits the AMD PDU to lower layer.

Upon notification of a transmission opportunity by lower layer, for each AMD PDU submitted for transmission, the transmitting side of an AM RLC entity:
  >if both the transmission buffer and the retransmission buffer becomes empty (excluding transmitted RLC SDUs or RLC SDU segments awaiting acknowledgements) after the transmission of the AMD PDU; or
  >if no new RLC SDU can be transmitted after the transmission of the AMD PDU (e.g. due to window stalling);
  >>sets the P field of the AMD PDU to "1";
  >>sets PDU_WITHOUT_POLL to 0;
  >>sets BYTE_WITHOUT_POLL to 0;
  >submits the AMD PDU to lower layer.

It is required that empty RLC buffer (excluding transmitted RLC SDUs or RLC SDU segments awaiting acknowledgments) not lead to unnecessary polling when data waits in the upper layer (e.g. PDCP, SDAP, RRC). In order to keep the empty RLC buffer (excluding transmitted RLC SDUs or RLC SDU segments awaiting acknowledgments) from leading to unnecessary polling, the transmitting side of a an AM RLC entity may set the P field of an AMD PDU to "0" even when the RLC buffer becomes empty after transmission of the AMD PDU.

When the transmitting side of an AM RLC entity submits an AMD PDU to lower layer, the transmitting side of an AM RLC entity:
  >sets POLL_SN to SN of the AMD PDU including a poll, if the AMD PDU including a poll is submitted to lower layer;
  >>starts t-PollRetransmit, if t-PollRetransmit is not running;
  >>restarts t-PollRetransmit, if t-PollRetransmit is running.

When a poll retransmission timer t-PollRetransmit expires, the transmitting side of an AM RLC entity performs transmission or retransmission procedure to retransmit a poll.

When t-PollRetransmit expires, the transmitting side of an AM RLC entity:
  >if both the transmission buffer and the retransmission buffer are empty (excluding transmitted RLC SDU or RLC SDU segment awaiting acknowledgements); and/or
  >if no new RLC SDU or RLC SDU segment can be transmitted (e.g. due to window stalling):
  >>considers the RLC SDU with the highest SN among the RLC SDUs submitted to lower layer for retransmission;
  >includes a poll in an AMD PDU as described above.

In particular, the implementation of the present disclosure, upon expiry of t-PollRetransmit, when the RLC buffer is empty (excluding transmitted RLC SDU or RLC SDU segment awaiting acknowledgements) and/or when no new RLC SDU or RLC SDU segment can be transmitted (e.g. due to window stalling), the transmitting side of an AM RLC entity considers the RLC SDU with the highest SN among the RLC SDUs submitted to MAC for retransmission. The transmitting side of an AM RLC entity includes a poll in an AMD PDU including the RLC SDU considered for retransmission, and submits the AMD PDU to MAC for transmission when there is a transmission opportunity. In the implementation of the present disclosure, the RLC SDU considered for retransmission upon expiry of t-PollRetransmit, and when the RLC buffer is empty (excluding transmitted RLC SDU or RLC SDU segment awaiting acknowledgements), or no new RLC SDU or RLC SDU segment can be transmitted (e.g. due to window stalling) may be or may be not an RLC SDU having been submitted with a poll to MAC. In the implementation of the present disclosure, the RLC SDU considered for retransmission upon expiry of t-PollRetransmit, and when no new RLC SDU or RLC SDU segment can be transmitted (e.g. due to window stalling) may be not an RLC SDU included in the last constructed AMD PDU. This implementation of the present disclosure is advantageous in that the transmitting side of an AM RLC entity requests that the receiving side of the AM RLC entity send a status report on up to the last RLC SDU actually sent by the transmitting side of the AM RLC entity to the receiving side of the AM RLC entity.

When the transmitting side of an AM RLC entity receives a STATUS report comprising a positive or negative acknowledgement for the RLC SDU with SN equal to POLL_SN, the transmitting side of an AM RLC entity stops and resets t-PollRetransmit, if t-PollRetransmit is running.

Figure 10A:
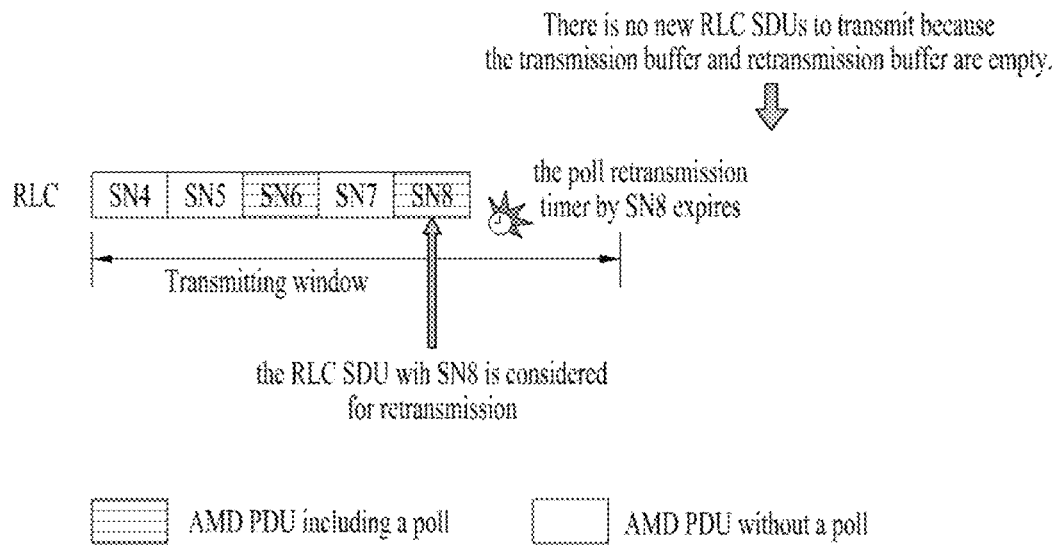
FIGS. 10A and 10B illustrate examples of data transfer according to the implementations of the present disclosure.
Figure 10B:
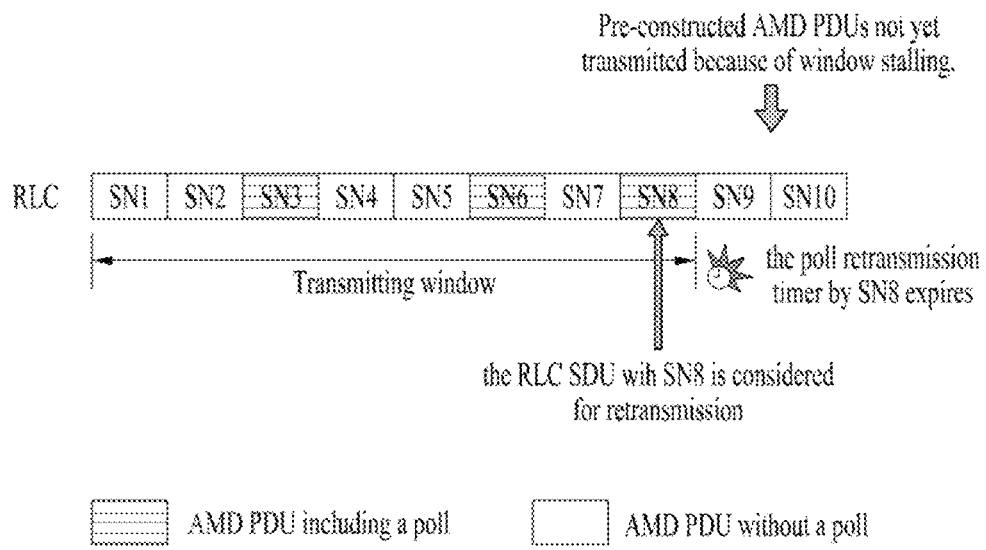

FIGS. 10A and 10B illustrate examples of data transfer according to the implementation(s) of the present disclosure. In FIGS. 10A and 10B, it is assumed that all RLC SDUs have same size which is 100 bytes, pollPDU is 3, pollByte is 400 bytes, and the transmitting window size is 8.

FIG. 10A shows an example where t-PollRetransmit expires and both the transmission buffer and the retransmission buffer are empty (excluding transmitted RLC SDU or RLC SDU segment awaiting acknowledgements). In FIG. 10A, when the transmitting side of an AM RLC entity receives notification of transmission opportunity by lower layer (e.g. MAC), the transmitting side of the AM RLC entity:

for AMD PDU which contains the RLC SDU for SN4: increments PDU_WITHOUT_POLL by one; increments BYTE_WITHOUT_POLL by 100 bytes; and submits the AMD PDU, which contains the RLC SDU for SN4, to lower layer;

for AMD PDU which contains the RLC SDU for SN5: increments PDU_WITHOUT_POLL by one; increments BYTE_WITHOUT_POLL by 100 bytes; and submits the AMD PDU, which contains the RLC SDU for SN5, to lower layer;

for AMD PDU which contains the RLC SDU for SN6: increments PDU_WITHOUT_POLL by one; increments BYTE_WITHOUT_POLL by 100 bytes; sets the P field of the AMD PDU to "1" which contains the RLC SDU for SN6 because PDU_WITHOUT_POLL is equal to pollPDU=3; sets PDU_WITHOUT_POLL to 0; sets BYTE_WITHOUT_POLL to 0; and submits the AMD PDU, which contains the RLC SDU for SN6, to lower layer; sets POLL_SN to SN6; starts t-PollRetransmit; increments PDU_WITHOUT_POLL by one;

for AMD PDU which contains the RLC SDU for SN7: increments BYTE_WITHOUT_POLL by 100 bytes; submits the AMD PDU, which contains the RLC SDU for SN7, to lower layer; increments PDU_WITHOUT_POLL by one;

for AMD PDU which contains the RLC SDU for SN8: increments BYTE_WITHOUT_POLL by 100 bytes; sets the P field of the AMD PDU to "1" which contains the RLC SDU for SN8 because both the transmission buffer and the retransmission buffer are empty (excluding transmitted RLC SDU or RLC SDU segment awaiting acknowledgements) after the transmission of the AMD PDU; sets PDU_WITHOUT_POLL to 0; sets BYTE_WITHOUT_POLL to 0; submits the AMD PDU, which contains the RLC SDU for SN8, to lower layer; sets POLL_SN to SN8; and restarts t-PollRetransmit.

All RLC SDUs from SN4 to SN8 are transmitted and wait for acknowledgement. As shown in FIG. 10A, when the t-PollRetransmit expires, the transmitting side of an AM RLC entity:
>checks whether the transmission buffer and the retransmission buffer are empty or not;
>considers the RLC SDU with SN8 for retransmission because SN8 is the highest SN among the RLC SDUs submitted to lower layer (i.e., MAC), if the transmission buffer and the retransmission buffer are empty;
>retransmits the selected RLC SDU with SN8.

FIG. 10B shows an example where t-PollRetransmit expires and no new RLC SDU can be transmitted (e.g. due to window stalling). In FIG. 10B, when the transmitting side of an AM RLC entity receives notification of a transmission opportunity by lower layer (e.g. MAC), the transmitting side of the AM RLC entity:

for AMD PDU which contains the RLC SDU for SN1: increments PDU_WITHOUT_POLL by one; increments BYTE_WITHOUT_POLL by 100 bytes; and submits the AMD PDU, which contains the RLC SDU for SN1, to lower layer;

for AMD PDU which contains the RLC SDU for SN2: increments PDU_WITHOUT_POLL by one; increments BYTE_WITHOUT_POLL by 100 bytes; and submits the AMD PDU, which contains the RLC SDU for SN2, to lower layer;

for AMD PDU which contains the RLC SDU for SN3: increments PDU_WITHOUT_POLL by one; increments BYTE_WITHOUT_POLL by 100 bytes; sets the P field of the AMD PDU to "1" which contains the RLC SDU for SN3 because PDU_WITHOUT_POLL is equal to pollPDU=3; sets PDU_WITHOUT_POLL to 0; sets BYTE_WITHOUT_POLL to 0; submits the AMD PDU, which contains the RLC SDU for SN3, to lower layer; sets POLL_SN to SN3; and starts t-PollRetransmit;

for AMD PDU which contains the RLC SDU for SN4: increments PDU_WITHOUT_POLL by one; increments BYTE_WITHOUT_POLL by 100 bytes; and submits the AMD PDU, which contains the RLC SDU for SN4, to lower layer;

for AMD PDU which contains the RLC SDU for SN5: increments PDU_WITHOUT_POLL by one; increments BYTE_WITHOUT_POLL by 100 bytes; and submits the AMD PDU, which contains the RLC SDU for SN5, to lower layer;

for AMD PDU which contains the RLC SDU for SN6: increments PDU_WITHOUT_POLL by one; increments BYTE_WITHOUT_POLL by 100 bytes; sets the P field of the AMD PDU to "1" which contains the RLC SDU for SN6 because PDU_WITHOUT_POLL is equal to pollPDU=3; sets PDU_WITHOUT_POLL to 0; sets BYTE_WITHOUT_POLL to 0; submits the AMD PDU, which contains the RLC SDU for SN6, to lower layer; and sets POLL_SN to SN6; and restarts t-PollRetransmit;

for AMD PDU which contains the RLC SDU for SN7: increments PDU_WITHOUT_POLL by one; increments BYTE_WITHOUT_POLL by 100 bytes; and submits the AMD PDU, which contains the RLC SDU for SN7, to lower layer;

for AMD PDU which contains the RLC SDU for SN8: increments PDU_WITHOUT_POLL by one; increments BYTE_WITHOUT_POLL by 100 bytes; sets the P field of the AMD PDU to "1" which contains the RLC SDU for SN8 because no new RLC SDU can be transmitted after the transmission of the AMD PDU (e.g. due to window stalling); sets PDU_WITHOUT_POLL to 0; sets BYTE_WITHOUT_POLL to 0; submits the AMD PDU, which contains the RLC SDU for SN8, to lower layer; sets POLL_SN to SN8; and restarts t-PollRetransmit.

All RLC SDUs from SN1 to SN8 are transmitted and wait for acknowledgement. As shown in FIG. 10B, when the t-PollRetransmit expires, the transmitting side of an AM RLC entity:

>checks whether no new RLC SDU can be transmitted (e.g. due to window stalling);
>considers the RLC SDU with SN8 for retransmission because SN8 is the highest SN among the RLC SDUs submitted to lower layer (i.e., MAC), if no new RLC SDU can be transmitted (e.g. due to window stalling);
>retransmits the selected RLC SDU with SN8.

In FIG. 10A and FIG. 10B, when the t-PollRetransmit expires, if both the transmission buffer and the retransmission buffer are empty (excluding transmitted RLC SDU or RLC SDU segment awaiting acknowledgements) or if no new RLC SDU can be transmitted (e.g. due to window stalling), the transmitting side of an AM RLC entity can consider the RLC SDU with SN8 for retransmission because SN8 is the highest SN of the AMD PDU among the set of AMD PDUs submitted to lower layer (i.e., MAC) for transmission.

Figure 11:
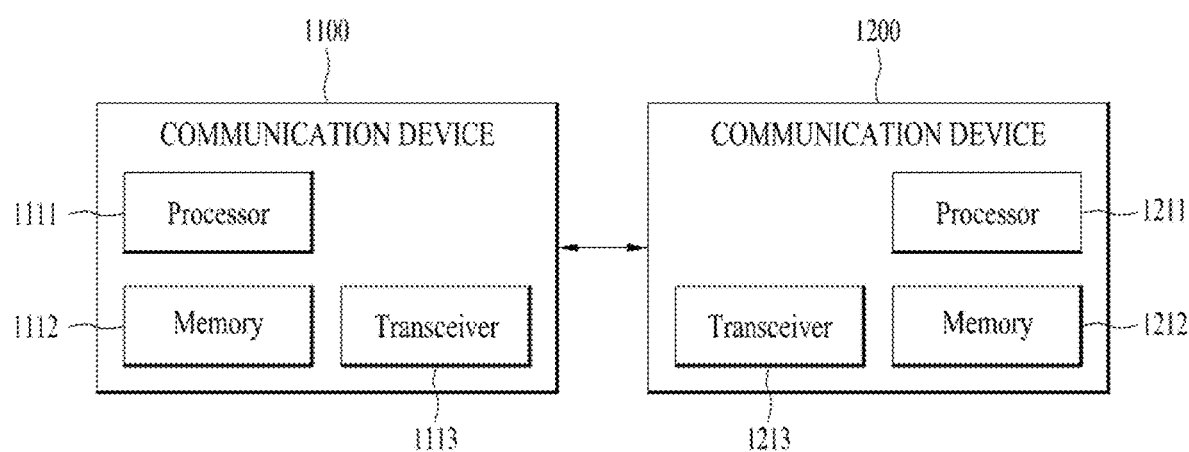
FIG. 11 is a block diagram illustrating examples of communication devices which can perform method(s) of the present disclosure.

FIG. 11 is a block diagram illustrating examples of communication devices which can perform method(s) of the present disclosure.

In FIG. 11, one of the communication device 1100 and the communication device 1200 may be a user equipment (UE) and the other one mat be a base station (BS). Alternatively, one of the communication device 1100 and the communication device 1200 may be a UE and the other one may be another UE. Alternatively, one of the communication device 1100 and the communication device 1200 may be a network node and the other one may be another network node. In the present disclosure, the network node may be a base station (BS). In some scenarios, the network node may be a core network device (e.g. a network device with a mobility management function, a network device with a session management function, and etc.).

In some scenarios of the present disclosure, either one of the communication devices 1100, 1200, or each of the communication devices 1100, 1200 may be wireless communication device(s) configured to transmit/receive radio signals to/from an external device, or equipped with a wireless communication module to transmit/receive radio signals to/from an external device. The wireless communication module may be a transceiver 1113 or 1213. The wireless communication device is not limited to a UE or a BS, and the wireless communication device may be any suitable mobile computing device that is configured to implement one or more implementations of the present disclosure, such as a vehicular communication system or device, a wearable device, a laptop, a smartphone, and so on. A communication device which is mentioned as a UE or BS in the present disclosure may be replaced by any wireless communication device such as a vehicular communication system or device, a wearable device, a laptop, a smartphone, and so on.

In the present disclosure, communication devices 1100, 1200 include processors 1111, 1211 and memories 1112, 1212. The communication devices 1100 may further include transceivers 1113, 1213 or configured to be operatively connected to transceivers 1113, 1213.

The processor 1111, 1211 implements functions, procedures, and/or methods disclosed in the present disclosure. One or more protocols may be implemented by the processor 1111, 1211. For example, the processor 1111, 1211 may implement one or more layers (e.g., functional layers such as PHY, MAC, RLC, PDCP, RRC, SDAP). The processor 1111, 1211 may generate protocol data units (PDUs) and/or service data units (SDUs) according to functions, procedures, and/or methods disclosed in the present disclosure. The processor 1111, 1211 may generate messages or information according to functions, procedures, and/or methods disclosed in the present disclosure. The processor 1111, 1211 may generate signals (e.g. baseband signals) containing PDUs, SDUs, messages or information according to functions, procedures, and/or methods disclosed in the present disclosure and provide the signals to the transceiver 1113 and/or 1213 connected thereto. The processor 1111, 1211 may receive signals (e.g. baseband signals) from the transceiver 1113, 1213 connected thereto and obtain PDUs, SDUs, messages or information according to functions, procedures, and/or methods disclosed in the present disclosure.

The processor 1111, 1211 may be referred to as controller, microcontroller, microprocessor, or microcomputer. The processor 1111, 1211 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processor 1111, 1211. The present disclosure may be implemented using firmware or software, and the firmware or software may be configured to include modules, procedures, functions, etc. performing the functions or operations of the present disclosure. Firmware or software configured to perform the present disclosure may be included in the processor 1111, 1211 or stored in the memory 1112, 1212 so as to be driven by the processor 1111, 1211.

The memory 1112, 1212 is connected to the processor of the network node and stores various types of PDUs, SDUs, messages, information and/or instructions. The memory 1112, 1212 may be arranged inside or outside the processor 1111, 1211, or may be connected to the processor 1111, 1211 through various techniques, such as wired or wireless connections.

The transceiver 1113, 1213 is connected to the processor 1111, 1211, and may be controlled by the processor 1111, 1211 to transmit and/or receive a signal to/from an external device. The processor 1111, 1211 may control the transceiver 1113, 1213 to initiate communication and to transmit or receive signals including various types of information or data which are transmitted or received through a wired interface or wireless interface. The transceiver 1113, 1213 includes a receiver to receive signals from an external device and transmit signals to an external device. The transceiver 1113, 1213 can up-convert OFDM baseband signals to a carrier frequency under the control of the processor 1111, 1211 and transmit the up-converted OFDM signals at the carrier frequency. The transceiver 1113, 1213 can include an (analog) oscillator, and up-convert the OFDM baseband signals to a carrier frequency by the oscillator. The transceiver 1113, 1213 may receive OFDM signals at a carrier frequency and down-convert the OFDM signals into OFDM baseband signals, under the control of the transceiver 1111, 1211. The transceiver 1113, 1213 may down-convert the OFDM signals with the carrier frequency into the OFDM baseband signals by the oscillator.

In a wireless communication device such as a UE or BS, an antenna facilitates the transmission and reception of radio signals (i.e. wireless signals). In the wireless communication device, the transceiver 1113, 1213 transmits and/or receives a wireless signal such as a radio frequency (RF) signal. For a communication device which is a wireless communication device (e.g. BS or UE), the transceiver 1113, 1213 may be referred to as a radio frequency (RF) unit. In some implementations, the transceiver 1113, 1213 may forward and convert baseband signals provided by the processor 1111, 1211 connected thereto into radio signals with a radio frequency. In the wireless communication device, the transceiver 1113, 1213 may transmit or receive radio signals containing PDUs, SDUs, messages or information according to functions, procedures, and/or methods disclosed in the present disclosure via a radio interface (e.g. time/frequency resources). In some implementations of the present disclosure, upon receiving radio signals with a radio frequency from another communication device, the transceiver 1113, 1213 may forward and convert the radio signals to baseband signals for processing by the processor 1111, 1211. The radio frequency may be referred to as a carrier frequency. In a UE, the processed signals may be processed according to various techniques, such as being transformed into audible or readable information to be output via a speaker of the UE.

In some scenarios of the present disclosure, functions, procedures, and/or methods disclosed in the present disclosure may be implemented by a processing device. The processing device may be a system on chip (SoC). The processing device may include the processor 1111, 1211 and the memory 1112, 1212, and may be mounted on, installed on, or connected to the communication device 1100, 1200. The processing device may be configured to perform or control any one of the methods and/or processes described herein and/or to cause such methods and/or processes to be performed by a communication device which the processing device is mounted on, installed on, or connected to. The memory 1112, 1212 in the processing device may be configured to store software codes including instructions that, when executed by the processor 1111, 1211, causes the processor 1111, 1211 to perform some or all of functions, methods or processes discussed in the present disclosure. The memory 1112, 1212 in the processing device may store or buffer information or data generated by the processor of the processing device or information recovered or obtained by the processor of the processing device. One or more processes involving transmission or reception of the information or data may be performed by the processor 1111, 1211 of the processing device or under control of the processor 1111, 1211 of the processing device. For example, a transceiver 1113, 1213 operably connected or coupled to the processing device may transmit or receive signals containing the information or data under the control of the processor 1111, 1211 of the processing device.

In the implementations of the present disclosure, a UE operates as a transmitting device in uplink (UL) and as a receiving device in downlink (DL). In the implementations of the present disclosure, a BS operates as a receiving device in UL and as a transmitting device in DL. In the present disclosure, a processor, a transceiver, and a memory, which are included in or mounted on a UE, are referred to as a UE processor, a UE transceiver, and a UE memory, respectively, and a processor, a transceiver, and a memory, which are included in or mounted on a BS, are referred to as BS processor, a BS transceiver, and a BS memory, respectively.

The AM RLC entity according to the implementation(s) of the present disclosure is implemented by the processor 1111, 1211.

The processor 1111, 1211 may be configured to construct M RLC PDUs including M RLC SDUs, respectively, before there is a transmission opportunity. When a transmission opportunity (hereinafter, first transmission opportunity) available to the processor 1111, 1211 occurs, the processor may transmit some or whole of the M RLC PDUs. The processor 1111, 1211 may transmit all the M RLC PDUs when the total size of RLC PDUs to be transmitted in the transmission opportunity is larger enough to accommodate all the M RLC PDUs and when all SNs of the M RLC PDUs fall within the transmitting window. In some situations, the processor 1111, 1211 may transmit only L RLC PDUs in the first transmission opportunity, where L<M. For example, if the M RLC PDUs include RLC PDU(s) whose SN(s) falls outside of the transmitting window, the processor 1111, 1211 does not submit/transmit the RLC SDU(s) whose SN(s) fall outside of the transmitting window. The L RLC PDUs have SNs falling within the transmitting window. The MAC entity configured in the processor 1111, 1211 may notify a RLC entity of the first transmission opportunity, and the RLC entity configured in the processor 1111, 1211 may submit only the L RLC PDUs for the first transmission opportunity among the M RLC PDUs. The L RLC PDUs include respective L RLC SDUs having lowest L SNs among SNs of the M RLC SDUs included in the M RLC PDUs. Each of the L RLC SDUs may be a (complete) RLC SDU or a segment of a RLC SDU.

The processor 1111, 1211 may include a poll in at least one RLC PDU (hereinafter, first RLC PDU) among the L RLC PDUs to be transmitted in the first transmission opportunity. The processor 1111, 1211 may be configured to set POLL_SN to SN of the first RLC PDU upon submitting the RLC PDU to MAC. In detail, the RLC entity may include a poll in the first RLC PDU among the L RLC PDUs, and start a poll retransmission timer upon submitting the first RLC PDU including a poll to MAC. The processor 1111, 1211 may construct a MAC PDU including the L RLC PDUs for the first transmission opportunity. The processor 1111, 1211 may transmit (or control the transceiver operably coupled or connected to the processor 1111, 1211 to transmit) the MAC PDU in the first transmission opportunity. The RLC entity may set POLL_SN to SN of the first RLC PDU upon submitting the RLC PDU to MAC.

The poll retransmission timer would not be restarted or stopped unless another transmission opportunity occurs or the processor 1111, 1211 receives a STATUS report comprising a positive or negative acknowledgement for the RLC SDU with SN equal to POLL_SN. The poll retransmission timer started based on the first RLC PDU may expire as time goes. Expiry of a poll retransmission timer may mean that there is no transmission opportunity between the first transmission opportunity and the expiry of the poll retransmission timer and the processor 1111, 1211 have not received a STATUS report comprising a positive or negative acknowledgement for the RLC SDU with SN equal to POLL_SN.

Upon expiry of the poll retransmission timer, the processor 1111, 1211 may determine whether the RLC buffer (e.g. transmission buffer and retransmission buffer) is empty excluding transmitted RLC or RLC SDU segment awaiting acknowledgment. In this example, the RLC buffer would have at least one RLC PDU since only L RLC PDUs among M RLC PDUs is submitted and transmitted and there is no other transmission opportunity after the first transmission opportunity and before the expiry of the poll retransmission timer. Upon expiry of the poll retransmission timer, the processor 1111, 1211 may determine whether a new RLC SDU can be transmitted. In the implementation(s) of the present disclosure, the new RLC SDU may mean an RLC SDU not transmitted previously or a RLC SDU segment not transmitted previously. The remaining RLC SDU(s) other than the already submitted/transmitted L RLC SDUs among the M RLC SDUs, and/or other RLC SDU(s) having SN(s) higher than the highest SN of the M RLC SDUs could be new RLC SDU(s) available for transmission unless there is a reason (e.g. window stalling) keeping them from being transmitted. For example, if SNs of the remaining RLC SDUs are outside of the transmission window, the processor 1111, 1211 may determine that the RLC SDUs in the RLC buffer, which have not been submitted to MAC or transmitted, cannot be transmitted. In such a case (or in the window stalling case), the processor 1111, 1211 may determine that no new RLC SDU or RLC segment can be transmitted. The processor 1111, 1211 is configured to consider the RLC SDU (hereinafter, second RLC SDU) with the highest SN among the RLC SDUs submitted to MAC (or among RLC SDUs transmitted to a receiving device) for retransmission when the poll retransmission timer expires and when no new RLC SDU or RLC SDU segment can be transmitted. In other words, the processor 1111, 1211 is configured to select the RLC SDU with the highest SN among the RLC SDUs submitted to MAC (or among RLC SDUs transmitted to a receiving device) for retransmission when the poll retransmission timer expires and when no new RLC SDU or RLC SDU segment can be transmitted. As the latest transmission opportunity is the first transmission opportunity, the highest SN among the RLC SDUs submitted to MAC (or transmitted to a receiving side) is the same as the highest SN among SNs of the L RLC SDUs submitted/transmitted in the first transmission opportunity. In other words, the RLC SDU with the highest SN among the L RLC SDUs is selected as an RLC SDU to be retransmitted.

The processor 1111, 1211 may form a new RLC PDU (hereinafter second RLC PDU) containing the second RLC SDU. The processor 1111, 1211 may form the second RLC PDU including a poll as well as the second RLC SDU. The processor 1111, 1211 may submit the second RLC PDU to MAC when a transmission opportunity (hereinafter, second transmission opportunity) occurs. The processor 1111, 1211 construct a MAC PDU the second RLC PDU, and transmit (or control the transceiver to transmit) the MAC PDU in the second transmission opportunity.

When, upon or while constructing the M RLC PDUs, the processor 1111, 1211 may update the state variable TX_Next. TX_Next would hold a value equal to 'the highest SN of the M RLC PDUs+1' right after constructing the M RLC PDUs. The processor 1111, 1211 may be configured to update TX_Next whenever the processor 1111, 1211 constructs an RLC PDU containing an RLC SDU with SN=TX_Next or the last segment of an RLC SDU with SN=TX_Next.

As described above, the detailed description of the preferred implementations of the present disclosure has been given to enable those skilled in the art to implement and practice the disclosure. Although the disclosure has been described with reference to exemplary implementations, those skilled in the art will appreciate that various modifications and variations can be made in the present disclosure without departing from the spirit or scope of the disclosure described in the appended claims. Accordingly, the disclosure should not be limited to the specific implementations described herein, but should be accorded the broadest scope consistent with the principles and novel features disclosed herein.

The implementations of the present disclosure are applicable to a network node (e.g., BS), a UE, or other devices in a wireless communication system.

What is claimed is:

1. A communication device for transmitting radio link control (RLC) protocol data units (PDUs) in a wireless communication system, the communication device comprising:
    a transceiver;
    at least one processor; and
    at least one computer memory that is operably connectable to the at least one processor and that has stored thereon instructions which, when executed, cause the at least one processor to perform operations comprising:
    constructing M RLC PDUs for M RLC service data units (SDUs), respectively, where M is larger than 1;
    based on constructing the M RLC PDUs, submitting, to a medium access control (MAC) layer of the communication device, only L RLC PDUs, among the M RLC PDUs, corresponding to L RLC SDUs among the M RLC SDUs, where the L RLC PDUs comprise a first RLC PDU that contains either a not previously transmitted RLC SDU or an RLC SDU segment containing a not previously transmitted byte segment, and has a poll to trigger status reporting at a receiving device;
    starting a poll retransmission timer based on submitting, to the MAC layer, the first RLC PDU having the poll;
    transmitting the L RLC PDUs to the receiving device;
    based on (i) expiration of the poll retransmission timer, and (ii) a state in which no new RLC SDU can be transmitted:
    selecting an RLC SDU for retransmission;
    constructing a second RLC PDU that comprises the selected RLC SDU; and
    transmitting the second RLC PDU comprising the selected RLC SDU,
    wherein selecting the RLC SDU for retransmission comprises:
    selecting, for retransmission, an RLC SDU with a highest sequence number (SN) among SNs of the L RLC SDUs submitted to the MAC layer, where L<M.

2. The communication device according to claim 1, wherein constructing the second RLC PDU comprises:
    including the poll into the second RLC PDU.

3. The communication device according to claim 1, wherein the operations further comprise:
    setting a first state variable to 1+a highest SN among SNs of the M RLC PDUs,
    wherein the first state variable holds an SN that is to be assigned for a newly generated RLC PDU, and
    wherein the first state variable is updated whenever an RLC PDU, which includes an RLC SDU or a last segment of an RLC SDU, is constructed with an SN that is equal to the first state variable.

4. The communication device according to claim 1, wherein the operations further comprise:
    constructing a MAC PDU comprising the L RLC PDUs; and
    transmitting, in a transmission opportunity, the MAC PDU.

5. The communication device according to claim 1, wherein the highest SN among the SNs of the L RLC SDUs submitted to the MAC layer is smaller than a highest SN among SNs of the M RLC SDUs.

6. The communication device according to claim 1,
wherein the L RLC PDUs are submitted for a transmission opportunity to the MAC layer in a state in which the L RLC PDUs comprise more than one RLC PDU having the poll, and the operations further comprise:
setting a second state variable to a highest SN among SNs of the more than one RLC PDU having the poll based on submitting the more than one RLC PDU having the poll for the transmission opportunity.

7. The communication device according to claim 1, wherein selecting the RLC SDU for retransmission comprises:
selecting, for retransmission, the RLC SDU with the highest SN among the SNs of the L RLC SDUs submitted to the MAC layer, in a state in which the RLC SDU with the highest SN among the SNs of the L RLC SDUs submitted to the MAC layer has been positively acknowledged.

8. A processing device comprising:
at least one processor; and
at least one computer memory that is operably connectable to the at least one processor and that has stored thereon instructions which, when executed, cause the at least one processor to perform operations comprising:
constructing M radio link control (RLC) protocol data units (PDUs) for M RLC service data units (SDUs), respectively, where M is larger than 1;
based on constructing the M RLC PDUs, submitting, to a medium access control (MAC) layer of the processing device, only L RLC PDUs, among the M RLC PDUs, corresponding to L RLC SDUs among the M RLC SDUs, where the L RLC PDUs comprise a first RLC PDU that contains either a not previously transmitted RLC SDU or an RLC SDU segment containing a not previously transmitted byte segment, and has a poll to trigger status reporting at a receiving device;
starting a poll retransmission timer based on submitting, to the MAC layer, the first RLC PDU having the poll;
transmitting the L RLC PDUs to the receiving device;
based on (i) expiration of the poll retransmission timer, and (ii) a state in which no new RLC SDU can be transmitted: selecting an RLC SDU for retransmission;
constructing a second RLC PDU that comprises the selected RLC SDU; and
transmitting the second RLC PDU comprising the selected RLC SDU,
wherein selecting the RLC SDU for retransmission comprises:
selecting, for retransmission, an RLC SDU with a highest sequence number (SN) among SNs of the L RLC SDUs submitted to the MAC layer, where L<M.

9. The processing device according to claim 8, wherein constructing the second RLC PDU comprises:
including the poll into the second RLC PDU.

10. The processing device according to claim 8, wherein the operations further comprise:
setting a first state variable to 1+a highest SN among SNs of the M RLC PDUs,
wherein the first state variable holds an SN that is to be assigned for a newly generated RLC PDU, and
wherein the first state variable is updated whenever an RLC PDU, which includes an RLC SDU or a last segment of an RLC SDU, is constructed with an SN that is equal to the first state variable.

11. The processing device according to claim 8, wherein the operations further comprises:
constructing a MAC PDU comprising the L RLC PDUs; and
transmitting, in a transmission opportunity, the MAC PDU.

12. The processing device according to claim 8, wherein the highest SN among the SNs of the L RLC SDUs submitted to the MAC layer is smaller than a highest SN among SNs of the M RLC SDUs.

13. The processing device according to claim 8,
wherein the L RLC PDUs are submitted for a transmission opportunity to the MAC layer in a state in which the L RLC PDUs comprise more than one RLC PDU having the poll, and the operations further comprise:
setting a second state variable to a highest SN among SNs of the more than one RLC PDU having the poll based on submitting the more than one RLC PDU having the poll for the transmission opportunity.

14. The processing device according to claim 8, wherein selecting the RLC SDU for retransmission comprises:
selecting, for retransmission, the RLC SDU with the highest SN among the SNs of the L RLC SDUs submitted to the MAC layer, in a state in which the RLC SDU with the highest SN among the SNs of the L RLC SDUs submitted to the MAC layer has been positively acknowledged.

15. A method of transmitting radio link control (RLC) protocol data units (PDUs) by a communication device in a wireless communication system, the method comprising:
constructing M RLC PDUs for M RLC service data units (SDUs), respectively, where M is larger than 1;
based on constructing the M RLC PDUs, submitting, to a medium access control (MAC) layer of the communication device, only L RLC PDUs, among the M RLC PDUs, corresponding to L RLC SDUs among the M RLC SDUs, where the L RLC PDUs comprise a first RLC PDU that contains either a not previously transmitted RLC SDU or an RLC SDU segment containing a not previously transmitted byte segment and has a poll to trigger status reporting at a receiving device;
starting a poll retransmission timer based on submitting, to the MAC layer, the first RLC PDU having the poll;
transmitting the L RLC PDUs to the receiving device;
based on (i) expiration of the poll retransmission timer, and (ii) a state in which no new RLC SDU can be transmitted: selecting an RLC SDU for retransmission;
constructing a second RLC PDU that comprises the selected RLC SDU; and
transmitting the second RLC PDU comprising the selected RLC SDU,
wherein selecting the RLC SDU for retransmission comprises:
selecting, for retransmission, an RLC SDU with a highest sequence number (SN) among SNs of the L RLC SDUs submitted to the MAC layer, where L<M.

16. The method according to claim 15, wherein constructing the second RLC PDU comprises:
including the poll into the second RLC PDU.

17. The method according to claim 15, further comprising:
setting a first state variable to 1+a highest SN among SNs of the M RLC PDUs,
wherein the first state variable holds an SN that is to be assigned for a newly generated RLC PDU, and
wherein the first state variable is updated whenever an RLC PDU, which includes an RLC SDU or a last segment of an RLC SDU, is constructed with an SN that is equal to the first state variable.

18. The method according to claim 15, wherein the highest SN among the SNs of the L RLC SDUs submitted to the MAC layer is smaller than a highest SN among SNs of the M RLC SDUs.

19. The method according to claim 15,
   wherein the L RLC PDUs are submitted for a transmission opportunity to the MAC layer in a state in which the L RLC PDUs comprise more than one RLC PDU having the poll, and the method further comprises:
   setting a second state variable to a highest SN among SNs of the more than one RLC PDU having the poll based on submitting the more than one RLC PDU having the poll for the transmission opportunity.

20. The method according to claim 15, wherein selecting the RLC SDU for retransmission comprises:
   selecting, for retransmission, the RLC SDU with the highest SN among the SNs of the L RLC SDUs submitted to the MAC layer, in a state in which the RLC SDU with the highest SN among the SNs of the L RLC SDUs submitted to the MAC layer has been positively acknowledged.

* * * * *